(12) United States Patent
Dryden

(10) Patent No.: US 9,537,935 B2
(45) Date of Patent: Jan. 3, 2017

(54) CONSUMER PC IN THE CLOUD

(71) Applicant: Eric Trent Dryden, Pearland, TX (US)

(72) Inventor: Eric Trent Dryden, Pearland, TX (US)

(*) Notice: Subject to any disclaimer, the term of this patent is extended or adjusted under 35 U.S.C. 154(b) by 416 days.

(21) Appl. No.: 14/293,888

(22) Filed: Jun. 2, 2014

(65) Prior Publication Data

US 2015/0350306 A1    Dec. 3, 2015

Related U.S. Application Data

(60) Provisional application No. 61/884,682, filed on Sep. 30, 2013.

(51) Int. Cl.
    *G06F 15/16*    (2006.01)
    *H04L 29/08*    (2006.01)
    *H04L 29/06*    (2006.01)
    *G06F 13/42*    (2006.01)

(52) U.S. Cl.
    CPC ........... *H04L 67/10* (2013.01); *G06F 13/4221* (2013.01); *H04L 67/42* (2013.01)

(58) Field of Classification Search
    None
    See application file for complete search history.

(56) References Cited

U.S. PATENT DOCUMENTS

| | | | |
|---|---|---|---|
| 6,323,846 B1 | 11/2001 | Westerman et al. | |
| 6,570,557 B1 | 5/2003 | Westerman et al. | |
| 6,677,932 B1 | 1/2004 | Westerman | |
| 7,457,878 B1 | 11/2008 | Mathiske et al. | |
| 7,957,762 B2 | 6/2011 | Herz et al. | |
| 8,539,025 B2 | 9/2013 | Husain et al. | |
| 8,600,430 B2 | 12/2013 | Herz et al. | |
| 2002/0015024 A1 | 2/2002 | Westerman et al. | |
| 2005/0190059 A1 | 9/2005 | Wehrenberg | |
| 2006/0017692 A1 | 1/2006 | Wehrenberg et al. | |
| 2006/0026521 A1 | 2/2006 | Hotelling et al. | |
| 2006/0026535 A1 | 2/2006 | Hotelling et al. | |
| 2006/0026536 A1 | 2/2006 | Hotelling et al. | |
| 2006/0033724 A1 | 2/2006 | Chaudhri et al. | |
| 2006/0053387 A1 | 3/2006 | Ording | |
| 2006/0085757 A1 | 4/2006 | Andre et al. | |
| 2006/0097991 A1 | 5/2006 | Hotelling et al. | |
| 2006/0161870 A1 | 7/2006 | Hotelling et al. | |
| 2006/0161871 A1 | 7/2006 | Hotelling et al. | |

(Continued)

*Primary Examiner* — Natisha Cox
(74) *Attorney, Agent, or Firm* — Tim Headley

(57) ABSTRACT

A client device has a power system, an operating system, a single chip containing a memory, a memory controller, a central processing unit (CPU), and a peripherals interface, wherein the peripherals interface communicates with external ports over one or more communication buses; an I/O subsystem comprising a display controller, input controllers, a touch screen which includes a soft keyboard, network circuitry, HDMI display/audio, a BIO-reader sensor, a camera, ports, a CDROM drive, an optical sensor coupled to an optical sensor controller, a SATA disk; a disk RAID controller; a Bluetooth device; a Bluetooth controller; an antenna; RF circuitry connected to the antenna; a proximity sensor, an accelerometer coupled to one of the input controllers; and audio circuitry connected to a speaker and a microphone. The client device is used to gain access to a user-adaptable, user-configurable UI-server which is provisioned across a cloud computing environment.

9 Claims, 27 Drawing Sheets

(56) References Cited

U.S. PATENT DOCUMENTS

| | | |
|---|---|---|
| 2006/0197753 A1 | 9/2006 | Hotelling |
| 2007/0075965 A1 | 4/2007 | Huppi et al. |
| 2007/0171210 A1 | 7/2007 | Chaudhri et al. |
| 2007/0172760 A1 | 7/2007 | Choi et al. |
| 2007/0247442 A1 | 10/2007 | Andre et al. |
| 2007/0257890 A1 | 11/2007 | Hotelling et al. |
| 2008/0088602 A1 | 4/2008 | Hotelling |
| 2008/0140868 A1 | 6/2008 | Kalayjian et al. |
| 2008/0167834 A1 | 7/2008 | Herz et al. |
| 2008/0204426 A1 | 8/2008 | Hotelling et al. |
| 2008/0211775 A1 | 9/2008 | Hotelling et al. |
| 2008/0211783 A1 | 9/2008 | Hotelling et al. |
| 2008/0211784 A1 | 9/2008 | Hotelling et al. |
| 2008/0211785 A1 | 9/2008 | Hotelling et al. |
| 2008/0231610 A1 | 9/2008 | Hotelling et al. |
| 2009/0066670 A1 | 3/2009 | Hotelling et al. |
| 2009/0096757 A1 | 4/2009 | Hotelling et al. |
| 2009/0096758 A1 | 4/2009 | Hotelling et al. |
| 2009/0174680 A1* | 7/2009 | Anzures ............... G06F 1/1626 345/173 |
| 2009/0178132 A1* | 7/2009 | Hudis ............... G06F 17/30867 726/12 |
| 2009/0315850 A1 | 12/2009 | Hotelling et al. |
| 2009/0315851 A1 | 12/2009 | Hotelling et al. |
| 2010/0048256 A1 | 2/2010 | Huppi et al. |
| 2010/0131948 A1* | 5/2010 | Ferris ............... G06F 9/50 718/1 |
| 2011/0055385 A1 | 3/2011 | Tung et al. |
| 2011/0055712 A1 | 3/2011 | Tung et al. |
| 2011/0055714 A1 | 3/2011 | Vemulapalli et al. |
| 2011/0086643 A1 | 4/2011 | Kalayjian et al. |
| 2011/0153727 A1* | 6/2011 | Li ............... G06F 9/5055 709/203 |
| 2011/0201381 A1 | 8/2011 | Herz et al. |
| 2012/0077503 A1 | 3/2012 | Kalayjian et al. |
| 2012/0105371 A1 | 5/2012 | Hotelling et al. |
| 2012/0293440 A1 | 11/2012 | Hotelling et al. |
| 2012/0297382 A1 | 11/2012 | Kim et al. |
| 2012/0317184 A1 | 12/2012 | Husain et al. |
| 2012/0319996 A1 | 12/2012 | Hotelling et al. |
| 2013/0019089 A1* | 1/2013 | Guidotti ............... G06F 9/5072 713/100 |
| 2013/0047095 A1 | 2/2013 | Escoda et al. |
| 2013/0106780 A1 | 5/2013 | Hotelling et al. |
| 2013/0111346 A1* | 5/2013 | Little ............... G06F 3/0482 715/716 |
| 2013/0124400 A1 | 5/2013 | Hawkett |
| 2013/0127636 A1 | 5/2013 | Aryanpur et al. |
| 2013/0154982 A1 | 6/2013 | Hotelling et al. |
| 2013/0173808 A1 | 7/2013 | Yoon et al. |
| 2013/0176496 A1 | 7/2013 | Sisto et al. |
| 2013/0227179 A1 | 8/2013 | Kalayjian et al. |
| 2013/0234853 A1 | 9/2013 | Kazerouni |
| 2013/0268290 A1 | 10/2013 | Jackson et al. |
| 2013/0275973 A1 | 10/2013 | Greenfield et al. |
| 2013/0311986 A1* | 11/2013 | Arrouye ............... G06F 8/61 717/175 |
| 2013/0318521 A1 | 11/2013 | Monaghan et al. |
| 2013/0346543 A1* | 12/2013 | Benantar ............... G06F 9/5055 709/217 |
| 2014/0012988 A1 | 1/2014 | Kruempelmann |
| 2014/0062955 A1 | 3/2014 | Hotelling et al. |
| 2014/0074426 A1 | 3/2014 | Hotelling et al. |
| 2014/0078108 A1 | 3/2014 | Hotelling et al. |
| 2014/0157378 A1* | 6/2014 | Childs ............... H04L 63/102 726/6 |
| 2014/0172491 A1* | 6/2014 | Karve ............... G06Q 10/06315 705/7.25 |
| 2015/0348185 A1* | 12/2015 | Frost ............... G06Q 20/227 705/35 |
| 2015/0378658 A1* | 12/2015 | Mandigo ............... H04L 67/141 358/1.15 |
| 2016/0226965 A1* | 8/2016 | Labranche ............... H04L 67/16 |

* cited by examiner

CONSUMER PC IN THE CLOUD

CROSS-REFERENCE TO RELATED APPLICATIONS

This patent application claims the benefit of provisional patent application Ser. No. 61/884,682, filed Sep. 30, 2013.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

BACKGROUND OF THE INVENTION (1) Field of the Invention

The invention relates to a method of storing and accessing not only data and programs over the Internet, but also storing and accessing the various component parts of a computer over the Internet.

(2) Description of Related Art (Including Information Disclosed Under 37 CFR 1.97 and 1.98)

The desire for the advancement of the technology has been a steady progression pushing the average computer beyond the comprehensible range of most users. Also, there is an ever increasing number of malicious attacks designed to interfere with the average consumer's usage of a computer. Consumers are all too often forced to buy a new computer because the old computer is so infected with malicious code that it is no longer usable.

Cloud computing typically involves using remote computing resources on a pay-per-use basis for a singular purpose, which is to leverage the data center resources for one-time application resources, where the remote computing resources may be used alone or in conjunction with the internal computing resources of a "data center." For example, the processing resources and storage resources of cloud providers such as Amazon Web Services, Microsoft Azure, Go Grid, Rackspace Cloud Servers, can be requested and used on-demand in a scalable fashion. As such, cloud computing can be used for applications with varying or unpredictable demand, as seen in year-end financials or tax-return preparation. Additionally, computationally-intensive processing can be performed using cloud computing resources. Cloud computing as described above does not support average users, who have limited understanding of available computer options and need help supporting their computer purchase(s).

A large portion of the success of information technology (IT) can be attributed to a single computing paradigm: client-server computing. In client-server computing, a client is typically a low-cost computing device that enables users to perform computing tasks on a remote server. The server, on the other hand, is typically a costly computer that is capable of performing complex computational tasks. The advantage obtained by coupling the powerful computing ability of a server with the cost savings of multiple low-cost clients is the main reason behind the success of client-server computing.

Unfortunately, over time, the clients in most client-server architectures were replaced by costly workstations. While these workstations interacted with back-end applications, such as large, server-resident databases, they were not true "clients" at all. Rather, they were clients that also had to perform a great deal of local computing.

This trend in client-server computing diminished the main advantage of the client-server paradigm by requiring clients to have expensive hardware and software components.

Recently, the concept of an ultra-thin-client was introduced, which has lately been gaining widespread popularity. For example, an ultra-thin-client can include a monitor, a keyboard, a mouse, and a built-in smart card reader. Ultra-thin-clients provide users with seamless access to all the applications and utilities they normally use on their workstations or PC's. One example of this technology is disclosed in U.S. Pat. No. 7,457,878, which is incorporated herein by this reference. Another example of this technology is called a "zero client device", as disclosed in U.S. Pat. No. 8,539,025, and in U.S. Published Patent Application Nos. 20120317184, and 20120297382, all three of which are incorporated herein by this reference.

However, this technology is usually only possible within controlled and educated IT-run organizations where the zero client server can be configured and set up for the user inside the confines of the office. Even in these controlled situations the user is provided with the configuration that someone else has chosen to fulfil the user's requirements.

The consumer of today needs to be allowed to choose how much or how little computer resources they require, and, with that, also a safe and controlled access to applications and support as they require. One example of this methodology is disclosed in U.S. Published Patent Application No. 20140012988 ("Kruempelmann"), which is incorporated herein by this reference. However, Kruempelmann relies on sophisticated users to send appropriate "resource requests" "that represent a list of one or more attributes of the required computing resources". Kruempelmann states, "For instance, based the resource request and the resource request parameters, system attributes of three local databases of 70 GB capacity each and one processor of 50 MHz speed are calculated. Calculating system attributes may include determining memory element requirements, input-output requirements, central processing unit (CPU) power consumption, and the like for the associated resource request and resource request parameters." Consumers often are not sophisticated enough to know the details of a computing system that they need or want. Purchase of a new computer should be due to the fact that the user has increased requirements. Consumers should have easy access to purchasing a new computer system, without the worry of having to know in advance their various options. They need an interactive "client device" that will ask them the pertinent questions needed to provide them with the computing power that they need. Consumers should have easy access to file backup and recovery without the worry of having to understand the complicated details.

BRIEF SUMMARY OF THE INVENTION

A client device, comprising a housing containing a portable multifunction device, the portable multifunction device further comprising:

a power system, wherein the power system comprises a power management system, a power source, a recharging system, a power failure detection circuit, a power converter, and a power status indicator;

an operating system, wherein the operating system comprises a memory, a biometric module, a communications module, a graphics module, a browser module, a bios module, and a client 2D/3D driver module;

a single chip containing the memory, a memory controller, a central processing unit (CPU), and a peripherals interface, wherein the peripherals interface communicates with external ports over one or more communication buses;

an I/O subsystem comprising a display controller, input controllers, a touch screen which includes a soft keyboard, network circuitry. HDMI display/audio, a BIO-reader sensor, a camera, a USB port, a thunderbolt port, an infrared port, a CDROM drive, a mouse, a channel adapter, and a machine tag;

an optical sensor coupled to an optical sensor controller, wherein the optical sensor comprises a charge-coupled device (CCD), and wherein the position of the optical sensor can be changed by the user;

a SATA disk; a disk RAID controller; a Bluetooth device; a Bluetooth controller; an antenna; RF circuitry connected to the antenna;

a proximity sensor, wherein the proximity sensor turns off and disables the touch screen when the device is in a closed state, and when the device is in a dark area;

an accelerometer coupled to one of the input controllers; and audio circuitry connected to a speaker and a microphone;

wherein the communication buses operate to allow the following systems on the portable multifunction device to communicate with each other: the touch screen with the display controller; the optical sensor with the optical sensor controller; the SATA disk with the disk RAID controller; the Bluetooth device with the Bluetooth controller, and the peripherals interface with the group comprising the I/O subsystem, the RF circuitry, the proximity sensor, the accelerometer and the audio circuitry. The client device is used to gain access to a user-adaptable, user configurable UI-server which is provisioned across a cloud computing environment.

BRIEF DESCRIPTION OF THE SEVERAL VIEWS OF THE DRAWINGS

The novel features, characteristic of the invention, are set forth in the appended claims. However, the invention itself, as well as a preferred mode of use, and further objectives and advantages thereof, will best be understood by reference to the following detailed description, when read in conjunction with the accompanying drawings in which the left-most significant digit(s) in the reference numerals denote(s) the first figure in which the respective reference numerals appear.

DETAILED DESCRIPTION OF THE INVENTION

Figure 1:
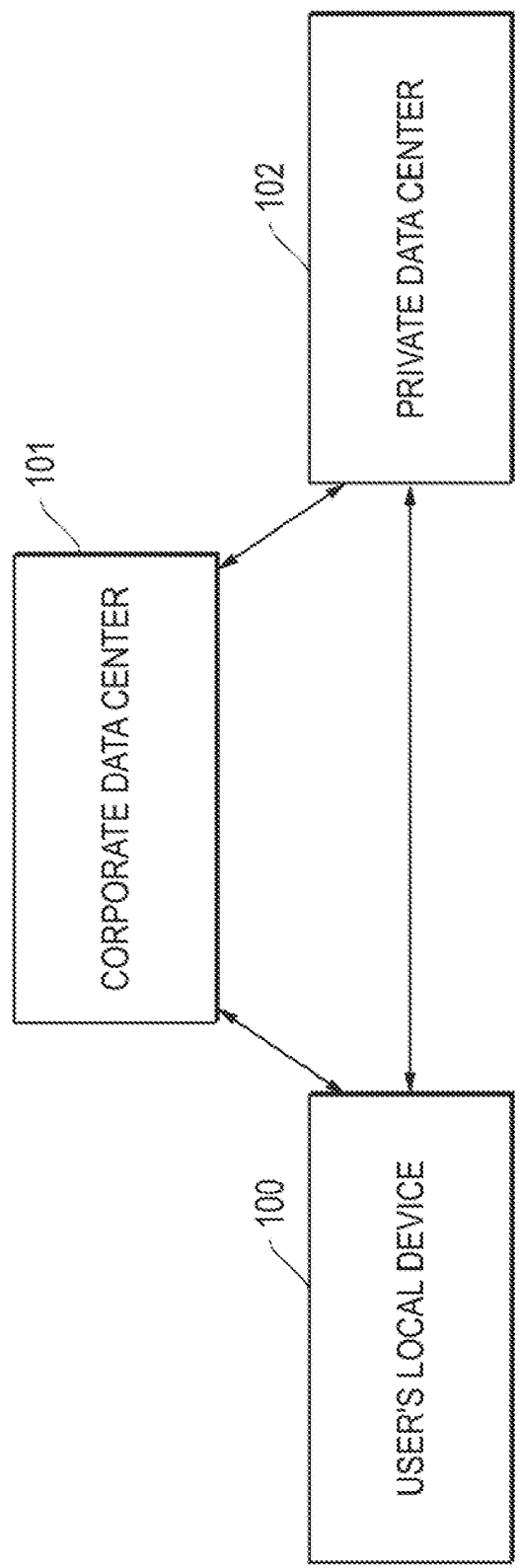
FIG. 1 illustrates the communication interaction between a user's local device and two data centers.

In this section, reference is made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

Although the terms first, second, and such may be used in this description to describe various elements, these elements are not limited by such terms. These terms are used only to distinguish one element from another, without departing from the scope of the present invention.

The terminology used in the description of the invention is for the purpose of describing particular embodiments only, and is not intended to limit the invention. As used in the description of the invention and the appended claims, the singular forms "a", "an", and "the" include the plural forms as well, unless the context clearly indicates otherwise. The term "and/or" refers to and encompasses any and all possible combinations of one or more of the associated listed items. The terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

All of these and similar terms are to be associated with the appropriate physical quantities and are merely convenient labels applied to these quantities. Unless specifically stated otherwise as apparent from the following discussions, throughout the description of the present invention, discussions utilizing the terms such as "aborting;" "accepting;" "accessing;" "adding;" "adjusting;" "allocating;" "analyzing;" "applying;" "assembling;" "assigning;" "balancing;" "blocking;" "calculating;" "capturing;" "combining;" "comparing;" "collecting;" "communicating;" "configuring;" "creating;" "debugging;" "defining;" "delivering;" "depicting;" "detecting;" "determining;" "displaying;" "downloading;" "establishing;" "executing;" "forwarding;" "flipping;" "generating;" "grouping;" "hiding;" "identifying;" "initiating;" "instantiating;" "interacting;" "modifying," "monitoring;" "moving;" "outputting," "parsing;" "performing;" "placing;" "presenting;" "processing;" "programming;" "providing;" "provisioning;" "querying;" "removing;" "rendering;" "repeating;" "resuming;" "sampling;" "simulating;" "sorting;" "storing;" "subtracting;" "suspending;" "tracking;" "transcoding;" "transforming;" "unblocking;" "using;" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices. Also, "user" and "consumer" are used interchangeably to mean the party for which work or an action is being implemented. Work or action could also occur as a result of a communicated request or a requirement resolution.

Referring now to FIG. 1, a block diagram illustrates the communication that is present during a user's interaction with cloud devices. During the configuration and logon, a user's local device 100 (also known as a "client device") contacts a corporate data center 101, and information is relayed to and from the user's local device 100 for setup and authentication. The corporate data center 101 maintains all the records. The corporate data center 101 gathers the required information to configure the options requested by the user. These options are not to be limited to the user's selected personal computer, but to contain a variety of choices, some of which may include game and television system and or drop box. When the entire required information gathering is complete, the corporate data center 101 contacts a private data center 102, which can be either public or private, and deliver instructions to the private data center 102 to build a computer to satisfy the user's request. Drivers and Icons to access the corporate data center 101 and the user's local device 100 are installed on the system or systems in the private data center 102. The users local device 100 connects to the configured system or systems in the private data center 102, and has transparent operation. Backup and recovery operations are performed at the private data center 102, although controlled by the corporate data center 101, and can be requested by the user's local device 100.

Figure 2:
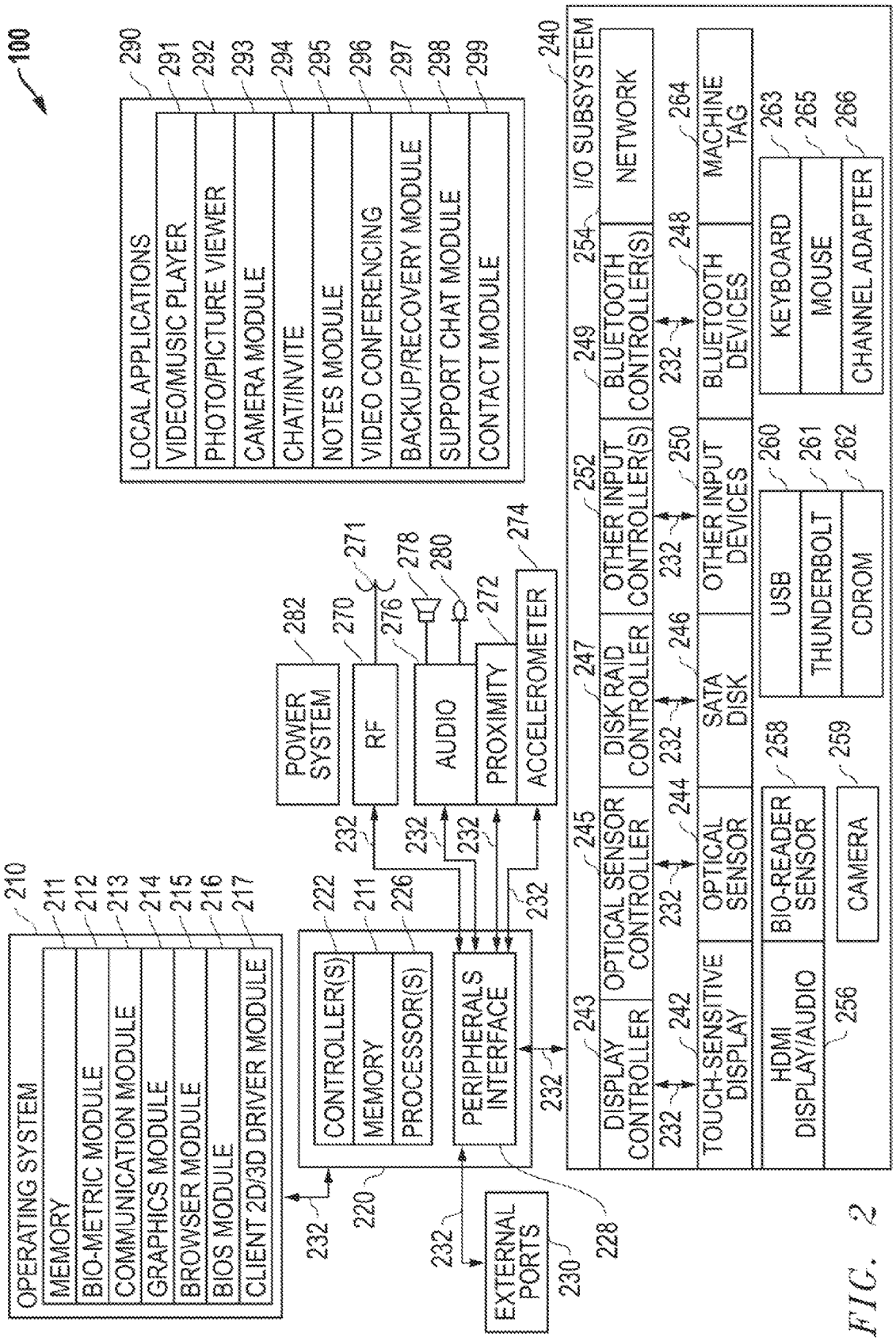
FIG. 2 illustrates the internal features of the user's local device.

FIG. 2 illustrates the various parts of the user's local device 100, which is a portable multifunction device. The user's local device 100 contains an operating system 210. The operating system 210 contains a memory 211, a biometric module 212, a communications module 213, a graphics module 214, a browser module 215, a bias module 216, and a client 2D/3D driver module 217.

The user's local device 100 also may contain, on a single chip 220, a memory controller 222, the memory 211, a central processing unit (CPU) 226, and a peripherals interface 228. The peripherals interface 228 communicates with external ports 230 over one or more communication buses 232. The peripherals interface 228 also communicates via the communication buses 232 with an I/O subsystem 240, also located on the user's local device 100. The I/O subsystem 240 includes a touch-sensitive display ("touch screen") 242, connected via the communication buses 232 to a display controller 243, an optical sensor 244, connected via the communication buses 232 to an optical sensor controller 245, a SATA disk 246, connected via the communication buses 232 to a disk RAID controller 247, a Bluetooth device 248, connected via the communication buses 232 to a Bluetooth controller 249, and may include other input devices 250 connected via the communication buses 232 to other input controllers 252.

The I/O subsystem 240 also includes network circuitry 254, HDMI Display/Audio 256, a BIO-Reader Sensor 258, Camera 259, USB 260, Thunderbolt 261, CDROM 262, a Keyboard 263, Mouse 265, Channel Adapter 266, and a machine tag 264.

The user's local device 100 also contains RF circuitry 270, connected to an antenna 271, a proximity sensor 272, an accelerometer 274, and audio circuitry 276, all of which communicate with the peripherals interface 228 via the communication buses 232. The audio circuitry also connects to a speaker 278 and a microphone 280. The user's local device 100 also contains a power system 282.

The user's local device 100 also contains local applications 290 which include a video/music player 291, a photo/picture viewer 292, a camera module 293, a chat/invite 294, a notes module 295, a video conferencing module 296, a backup/recovery module 297, support chat module 298, and a Contact Module 299. In conjunction with the RF circuitry 270, the audio circuitry 276, the speaker 278, the microphone 280, the touch screen 242, the display controller 243, the optical sensor 244, the optical sensor controller 245, and the graphics module 214, the video conferencing module 296 is used to initiate, conduct, and terminate a video conference between a user and one or more other participants. Embodiments of user interfaces and associated processes using the video conferencing module 296 are described further below.

The memory 211 includes high-speed random access memory and non-volatile memory, such as one or more magnetic disk storage devices, flash memory devices, or other non-volatile solid-state memory devices. Access to the memory 211 by other components of the device 100, such as the CPU 226 and the peripherals interface 228, is controlled by the memory controller 222.

The peripherals interface 228 couples the input and output peripherals of the device 100 to the CPU 226 and the memory 211. The CPU 226 executes various software programs and/or sets of instructions stored in the memory 211 to perform various functions for the device 100 and to process data.

In the preferred embodiment, the peripherals interface 228, the CPU 226, and the memory controller 222 are implemented on a single chip 220. In alternate embodiments, they are implemented on separate chips. The RF (radio frequency) circuitry 270 receives and sends RF signals, also called electromagnetic signals. The RF circuitry 270 converts electrical signals to/from electromagnetic signals and communicates with communications networks and other communications devices via the electromagnetic signals. The RF circuitry 270 includes well-known circuitry (not shown) for performing these functions, including but not limited to: an antenna system, an RF transceiver, one or more amplifiers, a tuner, one or more oscillators, a digital signal processor, a CODEC chipset, a subscriber identity module (SIM) card, memory. The RF circuitry 278 can communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication is adapted for using any of a plurality of communications standards, protocols and technologies, including, but not limited to: Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi), to support one or all from the group. IEEE 802.11a, IEEE 882.11 b, IEEE 802.11g, IEEE 802.11n, IEEE 802.11 ac, voice over Internet Protocol (VoIP), Wi-MAX, a protocol for email to include. Internet message access protocol [IMAP] and/or post office protocol [POP]), instant messaging to include extensible messaging and presence protocol (XMPP), Session Initiation Protocol for Instant Messaging and Presence Leveraging Extensions (SIMPLE), and/or Instant Messaging and Presence Service (IMPS)), and/or Short. Message Service (SMS)), or any other suitable communication protocol, including communication protocols not yet developed as of the filing date of this document. The network circuitry 254 is adapted for communicating with networks, such as the Internet, also referred to as the World Wide Web (WWW), an intranet and/or a wired network. The wired network communication is adapted for using any of a plurality of communications standards, protocols and technologies.

The audio circuitry 276, the speaker 278, and the microphone 288 provide an audio interface between a user and the device 100. The audio circuitry 276 receives audio data from the peripherals interface 228, converts the audio data to an electrical signal, and transmits the electrical signal to the speaker 278. The speaker 278 converts the electrical signal to human-audible sound waves. The audio circuitry 276 also receives electrical signals converted by the microphone 280 from sound waves. The audio circuitry 276 converts the electrical signal to audio data and transmits the audio data to the peripherals interface 228 for processing. Audio data is retrieved from and/or transmitted to the memory 211 and/or the RF circuitry 270 by the peripherals interface 228.

The I/O subsystem 240 couples input/output peripherals on the device 100, such as the touch screen 242 and other input/control devices 250, to the peripherals interface 228. The I/O subsystem 240 includes a display controller 243 and one or more input controllers 252 for other input or control devices. The one or more input controllers 252 receive/send electrical signals from/to other input devices 250. The other input devices 250 may include physical buttons (e.g. push buttons, rocker buttons, etc.), dials, slider switches, joysticks, click wheels, and so forth. In some alternate embodiments, input controllers 252 are coupled to any (or none) of the following: a keyboard, infrared port, USB port, CD-ROM/Blu-Ray, thunderbolt port, and a pointer device such as a mouse. The user can customize a functionality of one or more of the buttons. The touch screen 242 is used to implement virtual or soft buttons and one or more soft keyboards.

The touch screen 242 provides an input interface and an output interface between the device 100 and a user. The display controller 243 receives and/or sends electrical signals from/to the touch screen 242. The touch screen 242 displays visual output to the user. The visual output may include graphics, text, icons, video, and any combination thereof (collectively termed "graphics"). In some embodiments, some or all of the visual output may correspond to user-interface objects, further details of which are described below.

The touch screen 242 has a touch-sensitive set of sensors that accepts input from the user based on haptic and/or tactile contact. The touch screen 242 and the display controller 243 (along with associated modules and sets of instructions in the memory 211) detect contact (and any movement or breaking of the contact) on the touch screen 242 and convert the detected contact into interaction with user-interface objects, one or more soft keys, icons, web pages or images that are displayed on the touch screen 242. In the preferred embodiment, a point of contact between a touch screen 242 and the user corresponds to a finger of the user. The touch screen 242 displays visual output from the portable device 100.

In the preferred embodiment, the touch screen 242 uses LCD (liquid crystal display) technology, but in alternate embodiments the touch screen 242 can use LPD (light emitting polymer display) technology or other display technologies. The touch screen 242 and the display controller 243 detect contact and any movement or breaking thereof using, in the preferred embodiment, capacitive touch sensing technology, but in alternate embodiments could use any of a plurality of touch sensing technologies, including but not limited to, resistive, infrared, and surface acoustic wave technologies, as well as other proximity sensor arrays or other elements for determining one or more points of contact with the touch screen 242.

Touch-sensitive displays like the touch screen 242 are disclosed in U.S. Pat. No. 6,323,846, U.S. Pat. No. 6,570,557, U.S. Pat. No. 6,677,932, and U.S. Patent Publication 2002/0015024A1, each of which is hereby incorporated by reference in its entirety. Touch-sensitive displays like the touch screen 242 are also disclosed in the following published patent applications, which are all incorporated herein by this reference:

20120319996 Multipoint Touch Surface Controller
20090315851 Multipoint Touch Surface Controller
20090315850 Multipoint Touch Surface Controller
20070257890 Multipoint Touch Surface Controller
20140078108 Multipoint Touchscreen
20140062955 Multipoint Touchscreen
20130106780 Multipoint Touchscreen
20120105371 Multipoint Touchscreen
20090096758 Multipoint Touchscreen
20090096757 Multipoint Touchscreen
20090066670 Multipoint Touchscreen
20060097991 Multipoint Touchscreen
20080231610 Gestures For Touch Sensitive Input Devices
20080211785 Gestures For Touch Sensitive Input Devices
20080211784 Gestures For Touch Sensitive Input Devices
20080211783 Gestures For Touch Sensitive Input Devices
20080211775 Gestures For Touch Sensitive Input Devices
20080204426 Gestures For Touch Sensitive Input Devices
20060026536 Gestures For Touch Sensitive Input Devices
20060026521 Gestures For Touch Sensitive Input Devices
20120293440 Mode-Based Graphical User Interfaces For Touch Sensitive Input Devices
20060026535 Mode-Based Graphical User Interfaces For Touch Sensitive Input. Devices
20070172760 Virtual Input Device Placement On A Touch Screen User Interface
20060033724 Virtual Input Device Placement On A Touch Screen User Interface
20060053387 Operation Of A Computer With Touch Screen Interface
20070247442 Activating Virtual Keys Of A Touch-Screen Virtual Keyboard
20060085757 Activating Virtual Keys Of A Touch-Screen Virtual Keyboard
20080088602 Multi-Functional Hand-Held Device
20060197753 Multi-Functional Hand-Held Device In one embodiment, the touch screen 242 has a resolution in excess of 160 dpi. However, in the preferred embodiment, the touch screen 242 has a resolution of approximately 1080 dpi. The user may make contact with the touch screen 242 using any suitable object or appendage, such as a stylus, a finger, and so forth. In some embodiments, the touch screen 242 works primarily with finger-based contacts and gestures, which are much less precise than stylus-based input due to the larger area of contact of a finger on the touch screen. In some embodiments, the device 100 translates the rough finger-based input into a precise pointer/cursor position or command for performing the actions desired by the user.

In some embodiments, in addition to the touch screen 242, the device 100 may include a touchpad (not shown) for activating or deactivating particular functions. In some embodiments, the touchpad is a touch-sensitive area of the device 100 that, unlike the touch screen 242, does not display visual output. The touchpad is a touch-sensitive surface that is separate from the touch screen 242 or an extension of the touch-sensitive surface formed by the touch screen 242.

In some embodiments, the device 100 may include a physical or virtual click wheel as one of the other input control devices 250. A user may navigate among and interact with one or more graphical objects (henceforth referred to as icons) displayed in the touch screen 242 by rotating the click wheel or by moving a point of contact with the click wheel (e.g. where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel are processed by one of the input controllers 252, as well as one or more of the modules and/or sets of instructions in memory 211. For a virtual click wheel, the click wheel and click wheel controller are part of the touch screen 242 and the display controller 243, respectively. For a virtual click wheel, the click wheel is either an opaque or semi-transparent object that appears and disappears on the touch screen display in response to user interaction with the device. In some embodiments, a virtual click wheel is displayed on the touch screen of a portable multifunction device and operated by user contact with the touch screen.

The device 100 also includes a power system 282 for powering the various components. The power system 282 includes a power management system, one or more power sources (e.g. battery, alternating current (AC)), a recharging system, a power failure detection circuit, a power converter or inverter, a power status indicator (e.g. a light-emitting diode (LED)) and other components associated with the generation, management, and distribution of power in portable devices.

The device 100 also includes one or more optical sensors 244. FIG. 2 show an optical sensor 244 coupled to an optical sensor controller 245 in the I/O subsystem 240. The optical sensor 244 includes a charge-coupled device (CCD) or complementary metal-oxide semiconductor (CMOS) phototransistors. The optical sensor 244 receives light from the environment, projected through one or more lens, and converts the light to data representing an image. In conjunction with the camera module 293, the optical sensor 244 captures still images or video. In some embodiments, an optical sensor is located on the back of the device 100, opposite the touch screen display 242 on the front of the device, so that the touch screen display may be used as a viewfinder for either still and/or video image acquisition. In some embodiments, an optical sensor is located on the front of the device so that the users image may be obtained for video conferencing while the user views the other video conference participants on the touch screen display. In some embodiments, the position of the optical sensor 244 can be changed by the user (e.g. by rotating the lens and the sensor in the device housing) so that a single optical sensor 244 is used along with the touch screen display for both video conferencing and still and/or video image acquisition.

The device 100 also includes one or more proximity sensors 272, coupled to the peripherals interface 228. Alternately, the proximity sensor 272 is coupled to one of the input controllers 252. The proximity sensor 272 performs as described in the following U.S. patent applications, all of which are hereby incorporated by reference in their entirety:
20140074426 Proximity Detector In Handheld Device
20130154982 Proximity Detector In Handheld Device 20060161871 Proximity Detector In Handheld Device
20060161870 Proximity Detector In Handheld Device
20110201381 Using Ambient Light Sensor To Augment Proximity Sensor Output
20080167834 Using Ambient Light Sensor To Augment Proximity Sensor Output
20100048256 Automated Response To And Sensing Of User Activity In Portable Devices
20070075965 Automated' Response To And Sensing Of User Activity In Portable Devices
20130227179 Methods And Systems For Automatic Configuration Of Peripherals
20120077503 Methods And Systems For Automatic Configuration Of Peripherals
20110086643 Methods And Systems For Automatic Configuration Of Peripherals
20080140868 Methods And Systems For Automatic Configuration Of Peripherals In some embodiments, the proximity sensor 272 turns off and disables the touch screen 242 when the device 100 is in the closed state. In some embodiments, the proximity sensor 272 keeps the screen off when the device is in the user's pocket, purse, or other dark area to prevent unnecessary battery drainage when the device is a locked state.

The device 100 also includes one or more accelerometers 274 coupled to the peripherals interface 228. Alternately, the accelerometer 274 is coupled to the input controller 252 in the I/O subsystem 240. The accelerometer 274 performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers 274.

In some embodiments, the software components stored in the memory 211 include an operating system 210, a communications module (including a set of instructions) 213, a biometric module (including a set of instructions) 212, a graphics module (including a set of instructions) 214, a Bios module (including a set of instructions) 216, a browser module (including a set of instructions) 215, a client 2D/3D driver (including a set of instructions) module 217 and applications (or set of instructions) 290.

The operating system 210 (e.g. Darwin, RTXC, LINUX, UNIX, OS X, WINDOWS, Solaris, BSD or an embedded operating system such as VxWorks) includes various software components and/or drivers for controlling and managing general system tasks (e.g. memory management, storage device control, power management) and facilitates communication between various hardware and software components.

The communication module 213 facilitates communication with other devices over one or more external ports 230 and also includes various software components for handling data received by the RF circuitry 270 and/or the external ports 230. The external port 230 (e.g. Universal Serial Bus (USB), FIREWIRE, THUNDERBOLT, HDMI, HEADSET, MICROPHONE) is adapted for coupling directly to other devices or indirectly over a network (e.g. the Internet, wireless LAN).

The communication module 213 facilitates communication with other devices such as Bluetooth devices 248, which may include the keyboard 263, mouse 265, channel adapter 266, but may be expanded to include other devices. In an alternate embodiment, the Bluetooth devices 248 are coupled to the Bluetooth controller 249 in the I/O subsystem 240, coupled to the peripherals interface 228, and coupled to the RF circuitry 270 via implementation Class 3 (0-dBm maximum power, with a range limit of approximately 10 m) but in alternate embodiment includes Class 2 or greater.

The graphics module 214 includes various known software components for rendering and displaying graphics on the touch screen 242, including components for changing the intensity of graphics that are displayed. As used herein, the term "graphics" includes any object that can be displayed to a user, including, but not limited to and without limitation: text, web pages, icons (such as user-interface objects including soft keys), digital images, videos, and animations.

Examples of other local applications 290 that can be stored in the memory 211 include other word processing applications, JAVA-enabled applications, encryption, digital rights management, voice recognition, and voice replication.

In conjunction with RF circuitry 270, touch screen 242, display controller 243, graphics module 214, and browsing module 215, the chat/Invite module 294 is used to send text, still images, video, and/or other graphics to a blog (e.g. the user's blog). Embodiments of user interfaces and associated processes using Chat/Invite module 294 are described further below.

In conjunction with touch screen 242, display controller 243, optical sensor(s) 244, optical sensor controller 245, contact module 299, graphics module 214, and Photo/Picture Viewer 292, the camera module 293 is used to capture still images or video (including a video stream) and store them into memory 211, modify characteristics of a still image or video, or delete a still image or video from memory 211. Embodiments of user interfaces and associated processes using camera module 293 are described further below.

In conjunction with touch screen 242, display controller 243, graphics module 214, and camera module 293, the photo/picture viewer module 292 is used to arrange, modify or otherwise manipulate, label, delete, present (e.g. in a digital slide show or album), and store still and/or video images. Embodiments of user interfaces and associated processes using photo/picture viewer module 292 are described further below.

In conjunction with touch screen 242, display controller 243, graphics module 214, audio circuitry 276, and speaker 278, the video music player module 291 is used to display, present or otherwise play back videos (e.g. on the touch screen or on an external, connected display via external port 230). Embodiments of user interfaces and associated processes using video/music player module 291 are described further below.

In conjunction with touch screen 242, display system controller 243, graphics module 214, audio circuitry 276, speaker 278, RF circuitry 270, network 254, and browser module 215, the video/music player module 291 allows the user to download and play back recorded music and other sound files stored in one or more file formats, such as MP3 or AAC files. In some embodiments, the device 100 may include the functionality of an MP3 player. Embodiments of user interfaces and associated processes using video/music player module 291 are described further below.

In conjunction with RF circuitry 270, network 254, touch screen 242, display system controller 243, graphics module 214, the browser module 215, client 2D/3D driver module 217, are used to browse the Internet, including searching, linking to, receiving, and displaying web pages or portions thereof, as well as attachments and other files linked to web pages. Embodiments of user interfaces and associated processes using browser module 215 are described further below.

In conjunction with the RF circuitry 270, the network 254, the touch screen 242, the display system controller 243, the graphics module 214, the browser module 215, and the client 2D/3D driver module 217 are used to interact with the remotely configured system or systems configured for the user. This is accomplished transparent to the user with data transfer between client 2D/3D driver module 217 and server 2D/3D driver module 322.

In conjunction with the touch screen 242, the display controller 243, and the graphics module 214, the notes module 295 is used to create and manage notes, to do lists, and the like. Embodiments of user interfaces and associated processes using notes module 295 are described further below.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory 211 may store a subset of the modules and data structures identified above. Furthermore, memory 211 may store additional modules and data structures not described above.

In some embodiments, the device 100 is a device where operation of a predefined set of functions on the device is performed exclusively through a touch screen 242 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button is a physical push button or other physical input/control device instead of a touchpad.

Figure 3:
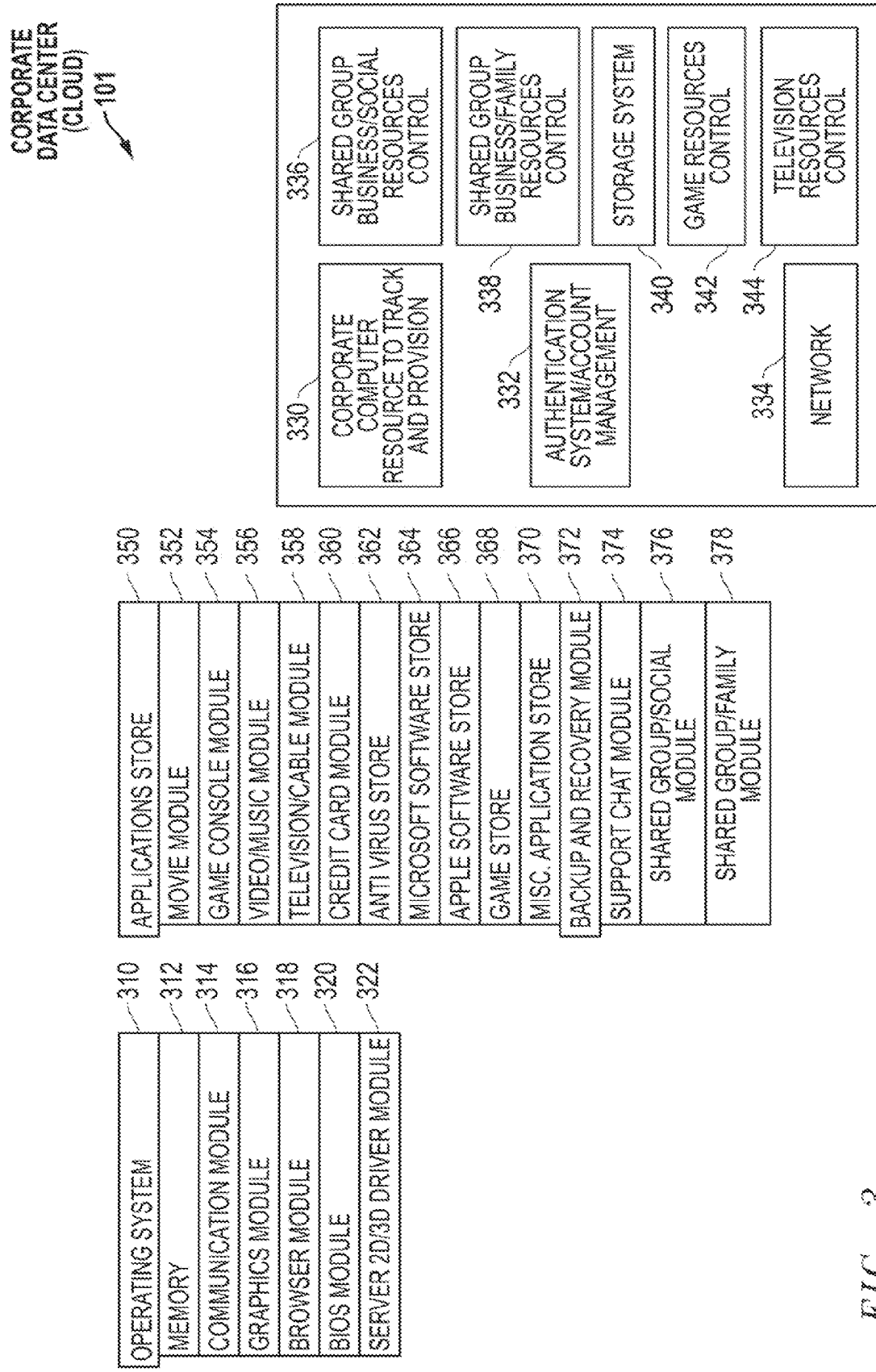
FIG. 3 illustrates the internals of the corporate data center (cloud).

Referring now to FIG. 3, the corporate data center 101 contains an operating system 310 which includes a memory 312, which may at any time contain the information of the operating system 310. The operating system 310 also contains a communication module 314, a graphics module 316, a browser module 318, a bins module 320, and a server 2D/3D driver module 322.

The corporate data center 101 also contains a corporate computer resource 330, an authentication system/account management 332, a network 334, a shared group business/social resources 336, a shared group business/family resources control 338, a storage system 340, a game resources control 342, and a television resources control 344.

The corporate data center 101 also contains an application store 350 which contains the following: a movie module 352, a game console module 354, a video/music module 356, a television/cable module 358, a credit card module 360, an anti-virus store 362, a Microsoft software store 364, an Apple software store 366, a game store 368, a miscellaneous application store 370, a backup/recovery module 372, a support chat module 374, a shared group/social chat module 376, and a shared group/family chat module 378. Obviously, additional modules can be added.

The corporate data center 101 is contacted by the local device 100. The operating system 310, coupled with the communication module 314, the graphics module 316, the browser module 318, the network 334, and the corporate computer resource 330 to track and provision, supplies the configuration questions when the configure or login button is pushed or toggled on the touch-sensitive display 242.

The operating system 310, coupled with the communication module 314, the graphics module 316, the browser module 318, and the corporate computer resource 330 to track and provision, stores the answers from the user in the storage system 340, which includes multiple protocol storage devices. The information stored in the user file of the storage system 340 contains the machine tag 264, all users' fingerprints from the bio-reader 258, information from the shared group/social chat module 376, information from the shared group/family chat module 378, information from the support chat module 374, purchased items from the applications store 350, and configuration answers.

The operating system 310 (e.g. Darwin, RTXC, LINUX, UNIX, OS X, WINDOWS, Solaris, BSD or an embedded operating system such as VxWorks) includes various software components and/or drivers for controlling and managing general system tasks (e.g. memory management, storage device control, power management, etc.) and facilitates communication between various hardware and software components.

The operating system 310 coupled with the communication module 314, the graphics module 316, the browser module 318, and the corporate computer resource 330 to track and provision, calculates selections based on configuration selection and the private data center 102 chosen by the user, the credit card module 360, and supplied for acceptance and completion by user.

When the corporate computer resource 330 has the required information, coupled with the operating system 310, coupled with the communication module 314, the graphics module 316, the browser module 318, the network 334, and the private data center 102, then the corporate computer resource 330 provides the information to build the system or systems for the user, and the system is built by the private data center 102 using technology selected by the private data center 102. The configured system can be a virtual or physical system, and can use various types of configurations.

Figure 4:
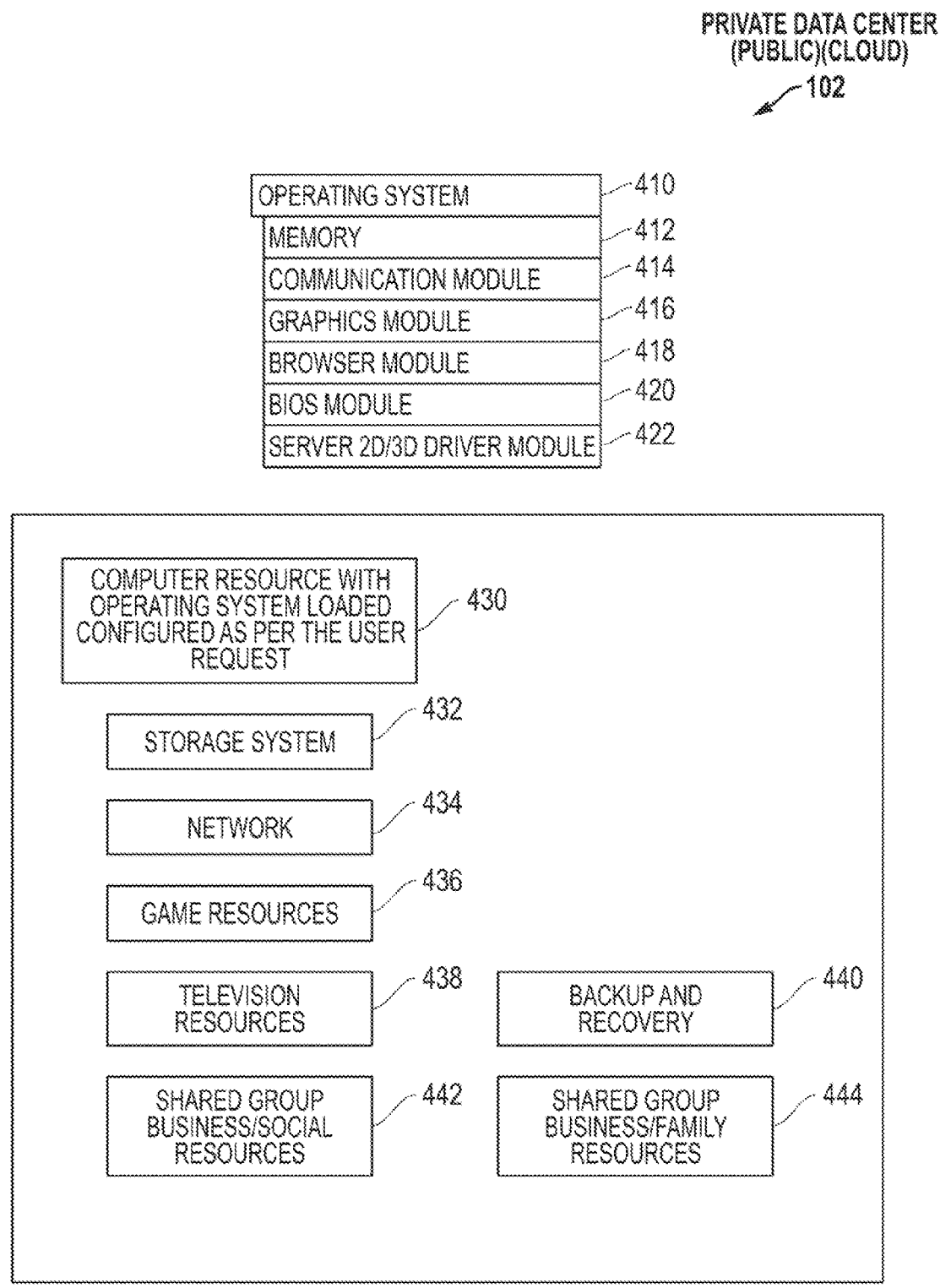
FIG. 4 illustrates the internals of the private data center (public cloud).

When the corporate computer resource 330 has the required information, coupled with the operating system 310, coupled with the communication module 314, the graphics module 316, the browser module 318, the network 334, and the private data center 102, then the corporate computer resource 330 will install on the users system or systems built for the user the server 2D/3D driver module 322 to communicate with the server 2D/3D driver module 422 (shown in FIG. 4).

The implementation of the software connection between the server 2D/3D driver module 322 and the server 2D/3D driver module 422 (shown in FIG. 4) is called Remote Graphics Software, and can move the data between driver modules using standard network protocols. The data is gathered in several ways, and the ones listed here are not to limit the design, but to leave room for improvements as technology advances. The data can originate in either the client or the server, and in either case the data is derived and packaged internal to the operating system, or external after the graphics card, and sent to the connected devices, whether server or client.

The memory 312 may at any time contain the information of the operating system 310, the communication module 314, the graphics module 316, the browser module 318, the bins module 320, the server 2D/3D driver module 322, the network 334, authentication system/account management 332, and the corporate computer resource 330.

When the corporate computer resource 330 has the required information from the user, coupled with the operating system 310, coupled with the communication module 314, the graphics module 316, the browser module 318, the network 334, and the private data center 102, then the corporate computer resource 330 will install on the user's system or systems built for the user the links to the application store 350 in which a user can select software to be installed on the system or systems built or configured for the user at the private data center 102.

The corporate data center 101 maintains the application store 350, coupled with the movie module 352, the game console module 354, the video/music module 356, the television/cable module 358, the credit card module 360, the anti-virus store 362, the Microsoft software store 364, the Apple software store 366, the game store 368, the miscellaneous application store 370, the backup/recovery module 372, the support chat module 374, the shared group/social chat module 376, and the shared group/family chat module 378. The user may add additional modules.

The movie module 352 is coupled with available movies that may be purchased/rented and streamed and available for viewing by the purchaser or the shared group/social chat module 376, or the shared group/family chat module 378.

The game console module 354 provides an additional resource that can be used to play purchased games when configured. This game console module 354 defaults to the system or system that was requested and built for the user unless other options are available.

The video/music module 356 can be used to purchase/play, but also to organize and share with the shared group/social chat module 376 and the shared group/family chat module 378.

The television/cable module 358 links to network television web sites and organizes the programs for easy viewing, and contains live programming.

The credit card module 360 is used only when payment transactions are required to proceed.

The antivirus store 362 has tested and proven antivirus applications for purchase that preform best in the virtual or physical system or systems structure selected by the user or selected for the user.

The Microsoft software store 364 contains the applications supported from Microsoft, and has a purchase cost that includes the license cost required by Microsoft.

The Apple software store 366 contains the applications supported from Apple, and has a purchase cost that is required by Apple. If during the selection process an Apple Macintosh computer is chosen, then only Apple software is utilized.

The game store 368 contains the games available for purchase. The game store 368 operates under the control of the game console module 354.

The miscellaneous application store 370 has software for purchase from all other software suppliers.

The backup/recovery module 297 and the backup/recovery module 372 work together to insure proper operation. The backup/recovery module 372 is set to preform backups at regular intervals. The backup/recovery module 297 can adjust the intervals, and preform tests to insure operation, and limit the resources consumed. The backup/recovery module 297 checks the backups, performs additional backups, and requests recoveries. Recovery of files is allowed by the user, but entire system or systems recovery can be performed only by the corporate data center 101, and can be requested from either the backup/recovery module 297, the support chat module 298 or from the support chat module 374.

The support chat module 298 and the support chat module 374 work together to track issues and enter tickets to be supported by the corporate data center 101, and, in some cases, get live support interaction. The correspondence with the user and tickets are retained in the storage system 340 for a to-be-determined length of time or until completed.

The option is available for the user using the support chat module 298 and the support chat module 374, after initial configuration, to request an upgrade or downgrade to the computer or computing resource in the private data center 102. This allows the modification of the computer or computing resource and reconnection to the applications, data, movies, games, and any other options configured for the user with little to no interaction by the user. Once the new selection is chosen and approved by the user, the old computer or computer resource is closed, and the new computer or computer resource is configured and reconnected to the user's previous selections, and all related functions are available.

The shared group/social chat module 376, the shared group/family chat module 378, and the corporate computer resource 330 are administered at the data center 101, with the storage provisioned and the data loaded at the private data center 102.

Referring now to FIG. 4, the private data center 102 contains an operating system 410 which includes a memory 412, which may at any time contain the information of the operating system 410. The operating system 410 also contains a communication module 414, a graphics module 416, a browser module 418, a bios module 420, and a server 2D/3D driver module 422.

The private data center 102 also contains a computer resource 430, a storage system 432, a network 434, a game resources control 436, a television resources control 438, a backup and recovery 440, a shared group business/social resources 442, and a shared group business/family resources control 444.

The operating system 410 maps the peripherals connected through the I/O subsystem 240, the peripherals interface 228, the memory controller 222, the operating system 210, the client 2D/3D driver module 217, the private data center 102, the Server 2D/3D driver module 322, to the operating system 310 on the selected and configured system or systems. This mapping allows the configured system computer resource 430 with the operating system loaded and configured as per the user request, to make the data, application or information on the peripherals from local device 100 available to all purchased, installed modules.

The private data center 102 is selected and duplicated in many locations, in order to keep the propagation delay between the user and the private data center 102 below 50 milliseconds one way.

The private data center 102, with the network 434, provides the necessary interfacing software to understand the required provisioning and place on the storage system 432. The system or systems configured and built may use virtual or physical technology.

The system configured and built in the private data center 102 has an operating system 410 chosen by the user during the selection process of either Windows. Apple, or others, including e.g. Darwin, RTXC, LINUX. UNIX, OS X, WINDOWS, Solaris, BSD or an embedded operating system such as VxWorks, and game console configurations.

The system configured and built in the private data center 102 has the operating system 410 coupled with the memory 412, the communication module 414, the graphics module 416, the browser module 418, the bias module 420, the server 2D/3D driver module 422, all of which may reside in memory together or separate as a virtual or physical, constitutes the computer resource 430, with the operating system loaded and configured as per the user request.

The backup/recovery module 297, the backup/recovery module 372, and the backup/recovery 440 work together to insure proper operation. The backup/recovery module 297 is set to perform backups at regular intervals. The backup/recovery module 372 can adjust the intervals, and perform tests to insure operation and limit the resources consumed. The backup/recovery module 297 can check the backups, perform additional backups, and request a recovery. Recovery of files is allowed by the user, but entire system or systems recovery can be performed only by the corporate data center 101, and can be requested from the backup/recovery module 372, the support chat module 298, or the support chat module 374.

The shared group/social chat module 376, the shared group/family chat module 378, and the corporate computer resource 330, are administered at the corporate data center 102 with the storage provisioned and the data loaded at the private data center 101, the shared group business/social resources 442, the shared group business/family resources control 444, and the storage system 432. The shared group business/social resources 442, the shared group business/family resources control 444, and the storage system 432, configured on computer resource 430 with operating system loaded and configured as per the computer resource 430, function as a "dropbox" technology to be shared with users in the selected and invited group.

The television resources control 438 works with the television/cable module 358 to store and retrieve network television web sites and organize the programs for easy viewing.

Figure 5:
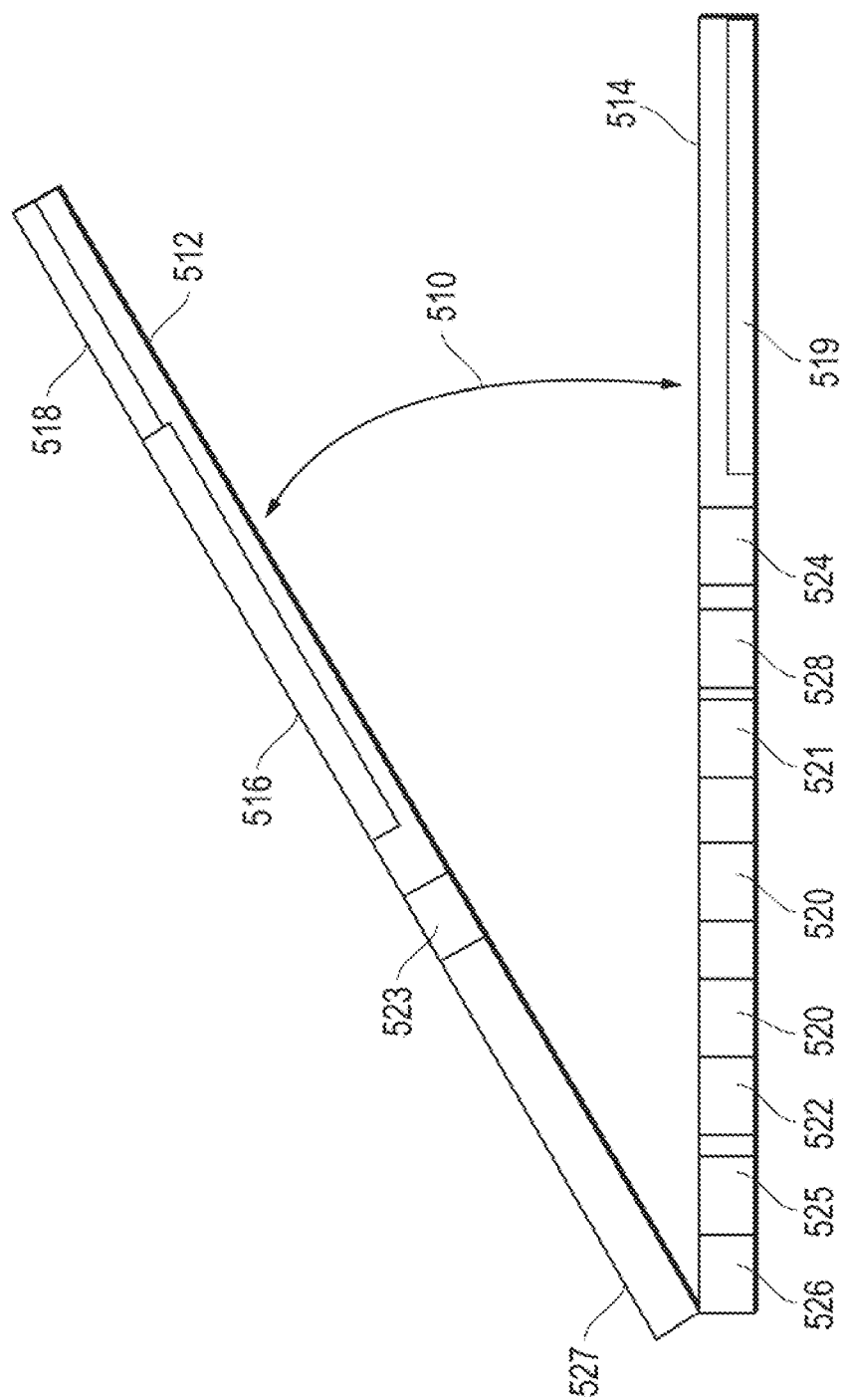
FIG. 5 illustrates the external features of the user's local device.

Referring now to FIG. 5, the user's local device 100 is a portable multifunction device that will open and close as a clam shell device with internal screens. The device 100 includes a clam shell case 510, a first screen 512, a second screen 514, a Bluetooth detachable keyboard/mouse 516, a Bluetooth detachable remote channel device 518, a CDROM/Blu-Ray Disk 519, a thunderbolt interface 520, an HDMI audio/graphic/video interface 521, a volume control 522, USB ports 523, 524, a power connector 525, a power switch 526, a headset/microphone connector 527, and a network (wired) 528. The external ports 230 include the USB ports 523, 524.

The volume control button 522 is for volume control of the speaker 278 and/or the microphone 280. A quick press of the power switch 526 disengages a lock of the touch screen 242 where a longer press of the push power switch 526 may turn power to the device 100 on or off. The headset/microphone connector 527 provides an interface between the audio circuitry 276 and removable audio input/output peripherals, such as output-only headphones or a headset with both output as a headphone for one or both ears and input as a microphone.

Figure 6:
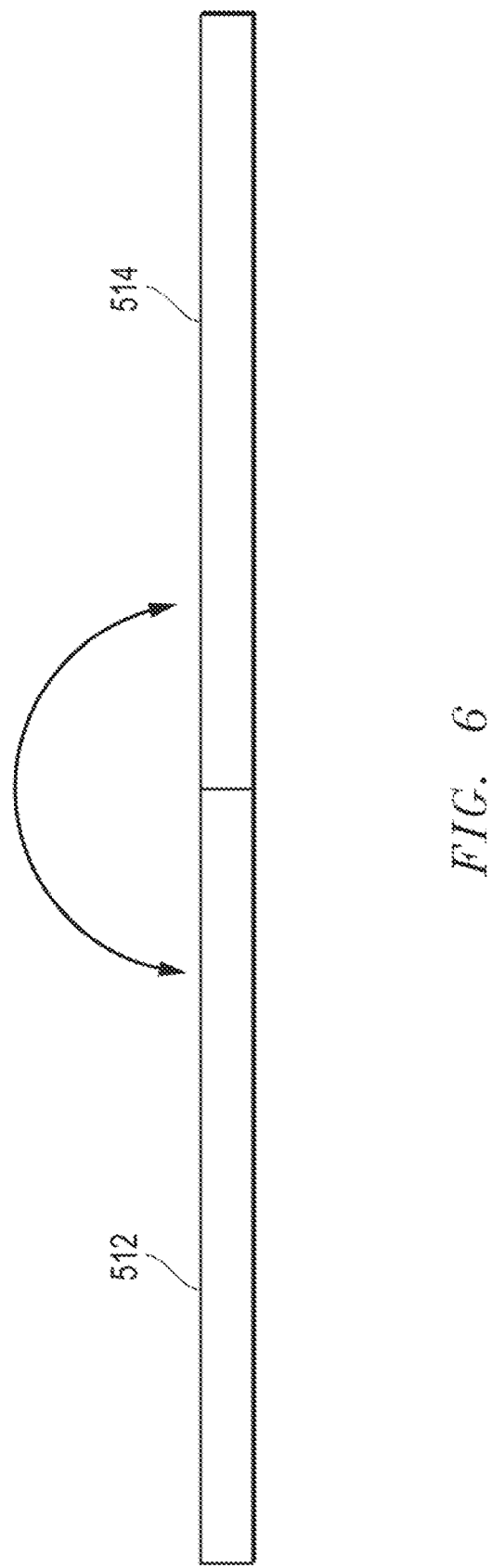
FIG. 6 illustrates a portable multifunction device that is capable of opening 180 degrees.

FIG. 6 illustrates the local device 100 shown open 180 degrees, with the first screen 512, and the optional screen 514.

Figure 7:
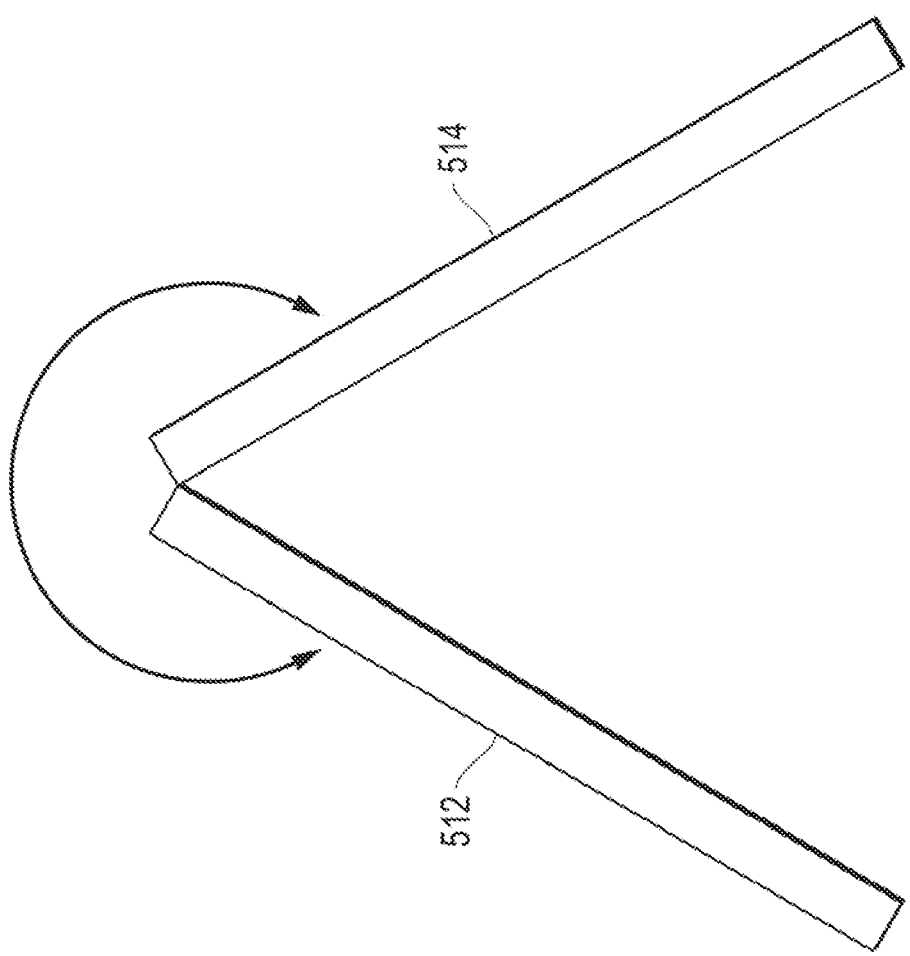
FIG. 7 illustrates a portable multifunction device that can be opened 240 degrees.

FIG. 7 illustrates the local device 100 shown open to 240 degrees with the first screen 512, and the optional screen 514.

Figure 8:
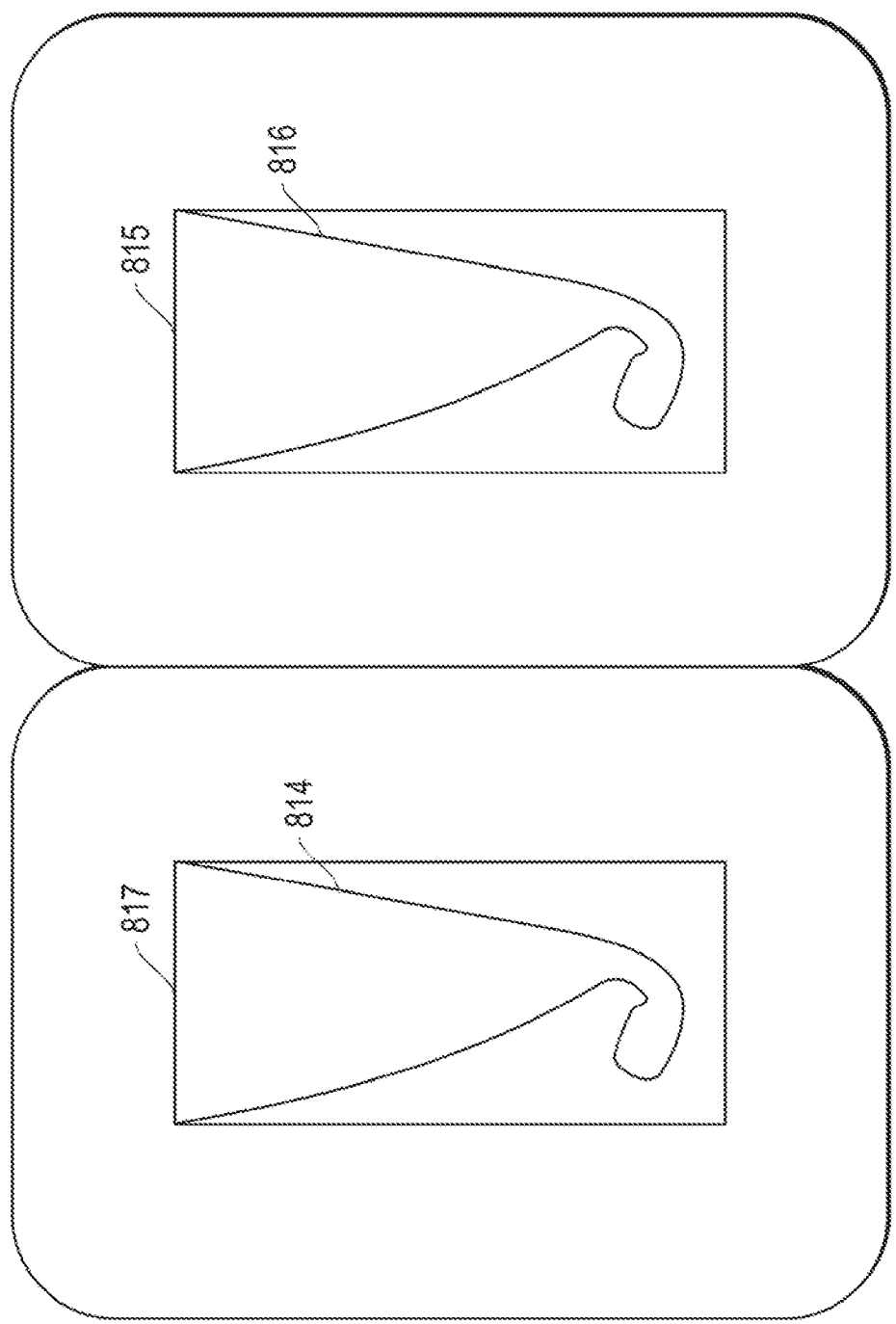
FIG. 8 illustrates a portable multifunction device rear view showing the standing and locking mechanism for support of the intended operation. The intention is not to limit and as technology improves so will this.

FIG. 8 illustrates the local device 100 shown with locking fingers 814, 816 on the rear 815, 817 when open to 240 degrees and 180 degrees, to secure the local device 100.

Figure 9B:
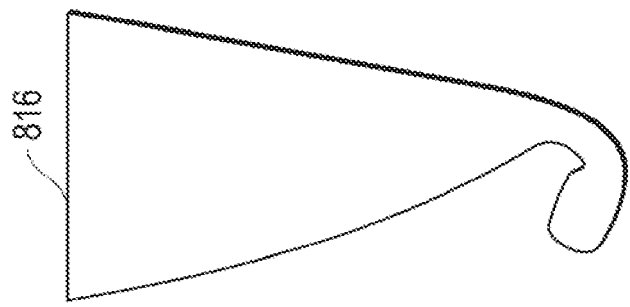
FIGS. 9A and 9B illustrate a portable multifunction device in the 180 degree operation (Standing) with the support legs.
Figure 9A:
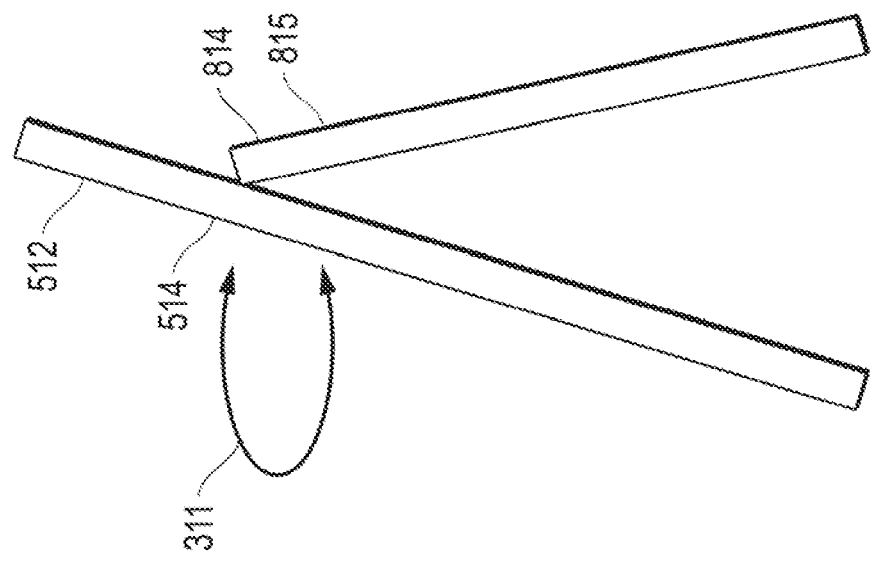

FIG. 9 illustrates the local device 100 opened to 180 degrees, and standing, using the locking fingers 814, 816.

Figure 10B:
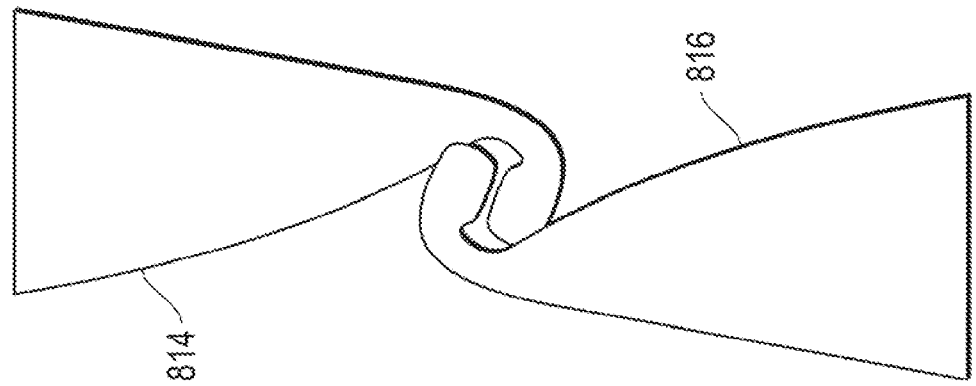
FIGS. 10A and 10B illustrate a portable multifunction device in the 240 degree operation (Standing) with the support legs locked.
Figure 10A:
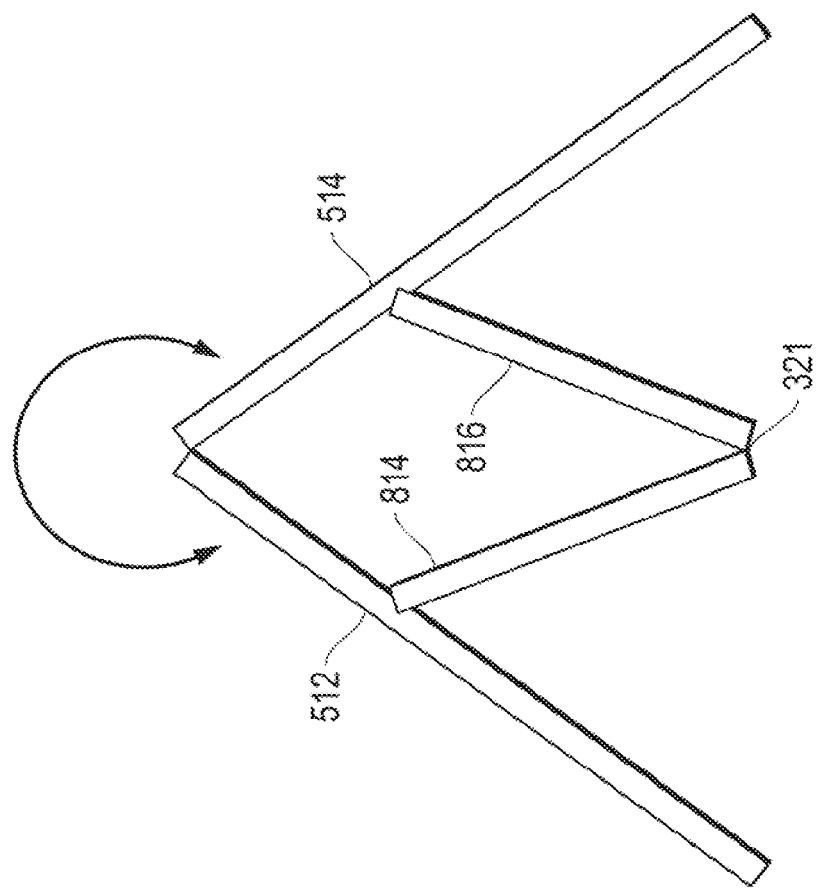

FIG. 10 illustrates the local device 100 opened to 240 degrees, and standing, using the locking fingers 814, 816. This configuration is dual screen conference mode.

Figure 11:
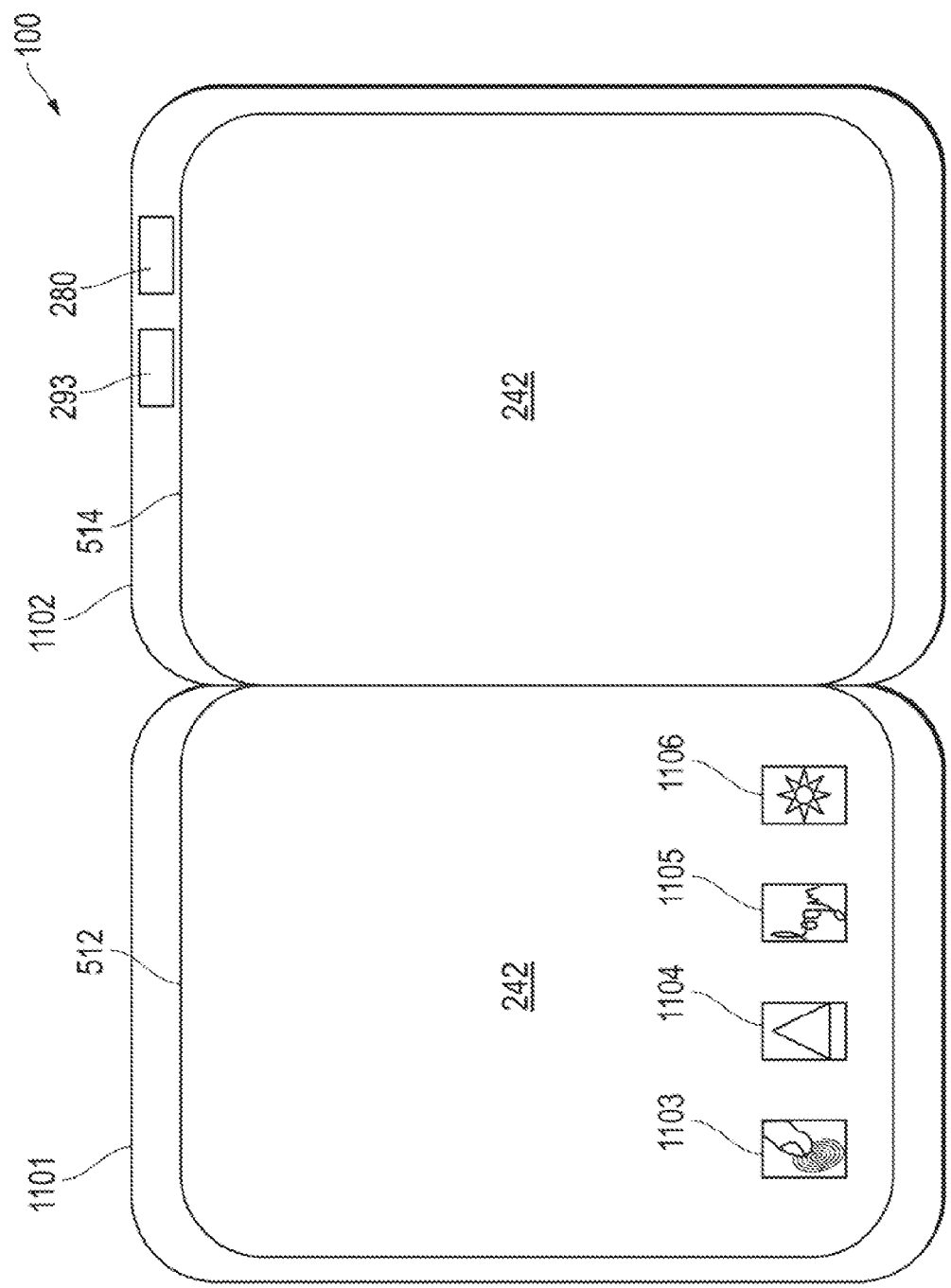
FIG. 11 illustrates a portable multifunction device with the multiple touch screen technology also showing the camera and microphone.

FIG. 11 illustrates the local device 100, showing a left case 1101, a right case 1102, the touch screens 242, the camera 293, the microphone 280, a fingerprint reader 1103, a configure button 1104, a login button 1105, and a settings button 1106.

Figure 12:
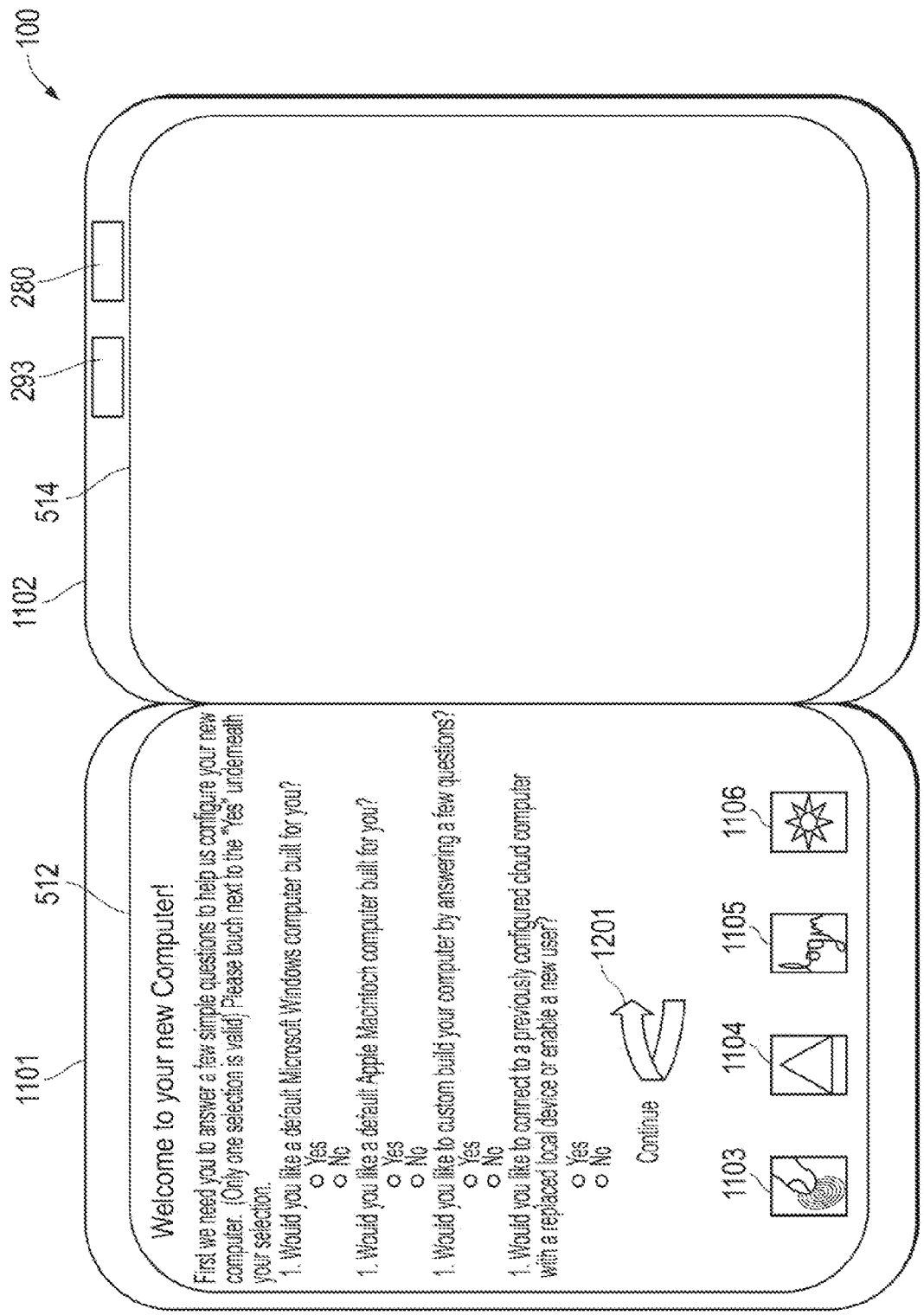
FIG. 12 illustrates a portable multifunction device in Single Screen Operation.

FIG. 12 illustrates the local device 100 in a single screen mode, showing the first screen 512, with a display coming from the corporate data center 101, with questions that require a response from the user via the users local device 100. The corporate computer resource 330 records the responses, and establishes the files to authenticate with to gain access each time. This process continues until enough information is gathered to request the private data center 102 to configure, construct, and build the requested system or systems for the user. Although the user is required to submit the configuration requirements only one time, and from this the private data center 102 will build the computer resource, and each successive time after the initial build the user will need to authenticate only through the corporate data center 101 using the bio-reader Sensor/Camera 258 to gain access to the built computer resource.

The questions that the user must answer are:
"Would you like a default Microsoft Windows computer built for you?"
"Would you like a default Apple Macintosh computer built for you?"
"Would you like to custom build your computer by answering a few questions?"
"Would you like to connect to a previously configured cloud computer with a replacement local device or enable a new user?"

Should the local device fail, the last question listed above allows reconnection to the private data center 102, specifically to the authentication system/account management 332. After the user has answered all the questions, he presses the continue button 1201.

Figure 13:
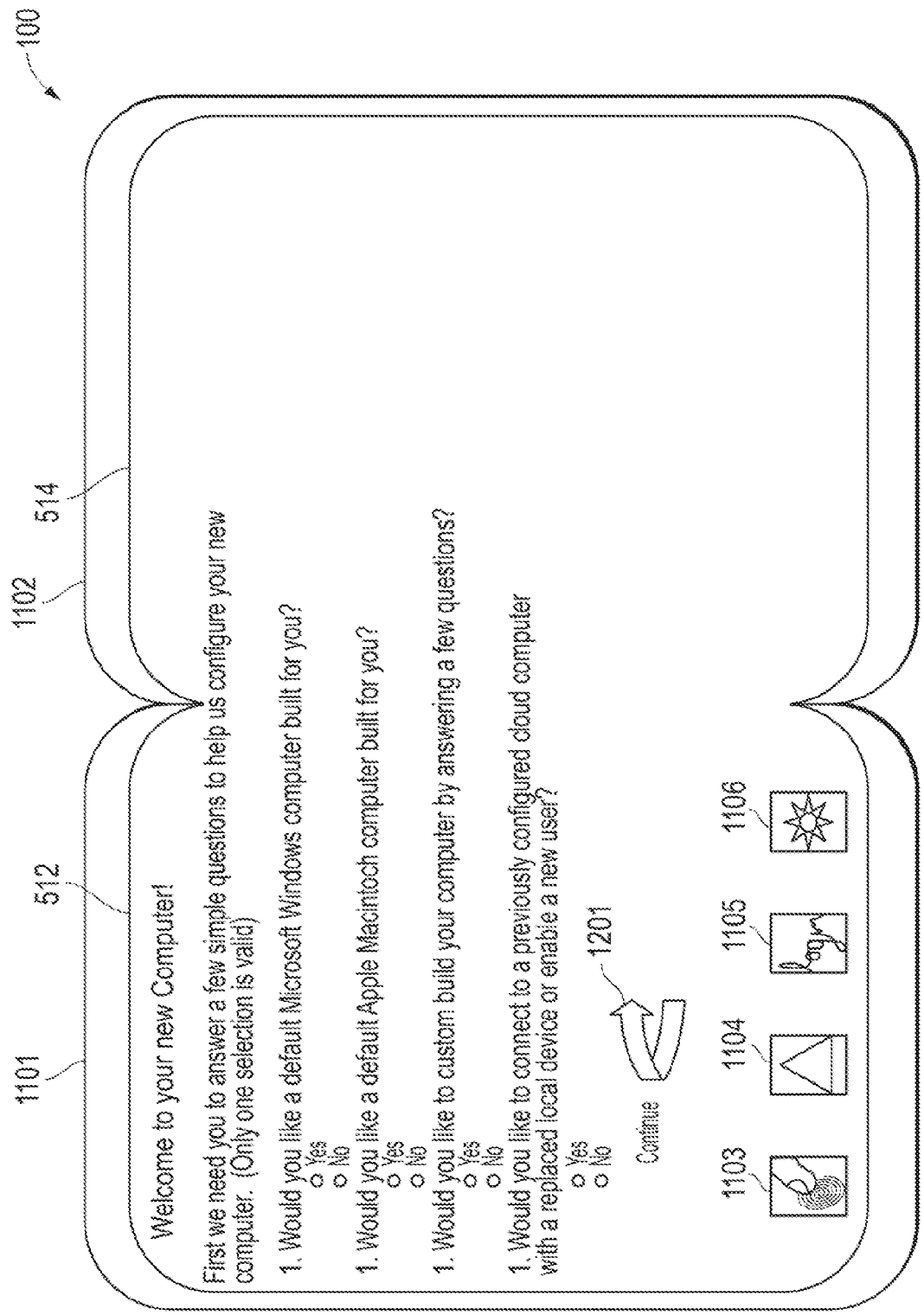
FIG. 13 illustrates a portable multifunction device in the Dual Screen Operation.

FIG. 13 illustrates the local device 100 in a dual screen mode, showing the first screen 512, and the second screen 514, with a display coming from the corporate data center 101. The screen configuration is set under the settings button 1106 on the local device 100, and not from the corporate data center 101, nor from the private data center 102.

Figure 14:
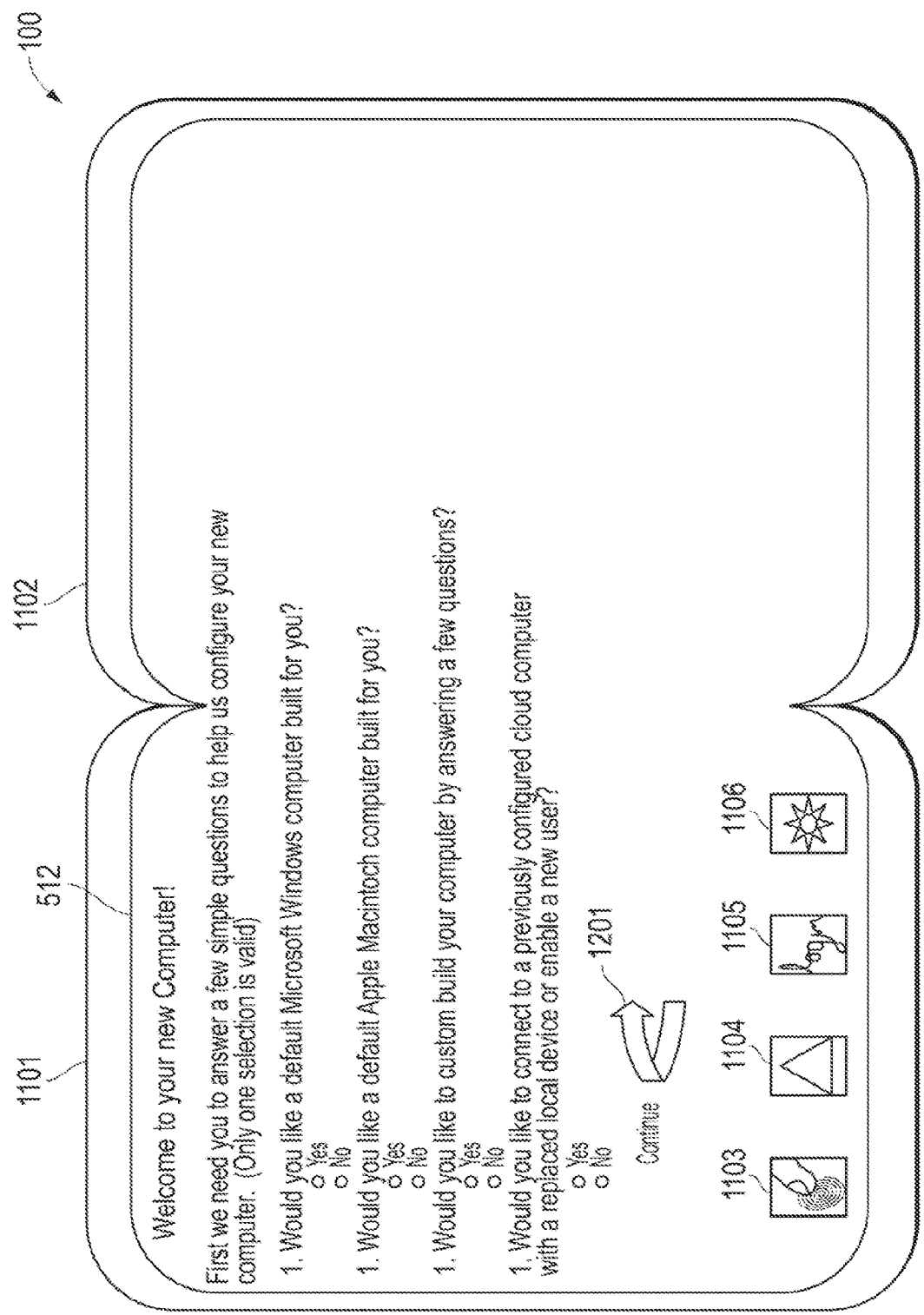
FIG. 14 illustrates a portable multifunction device in the Folding Screen Operation.

FIG. 14 illustrates the local device 100 in a folding screen mode.

Figure 15:
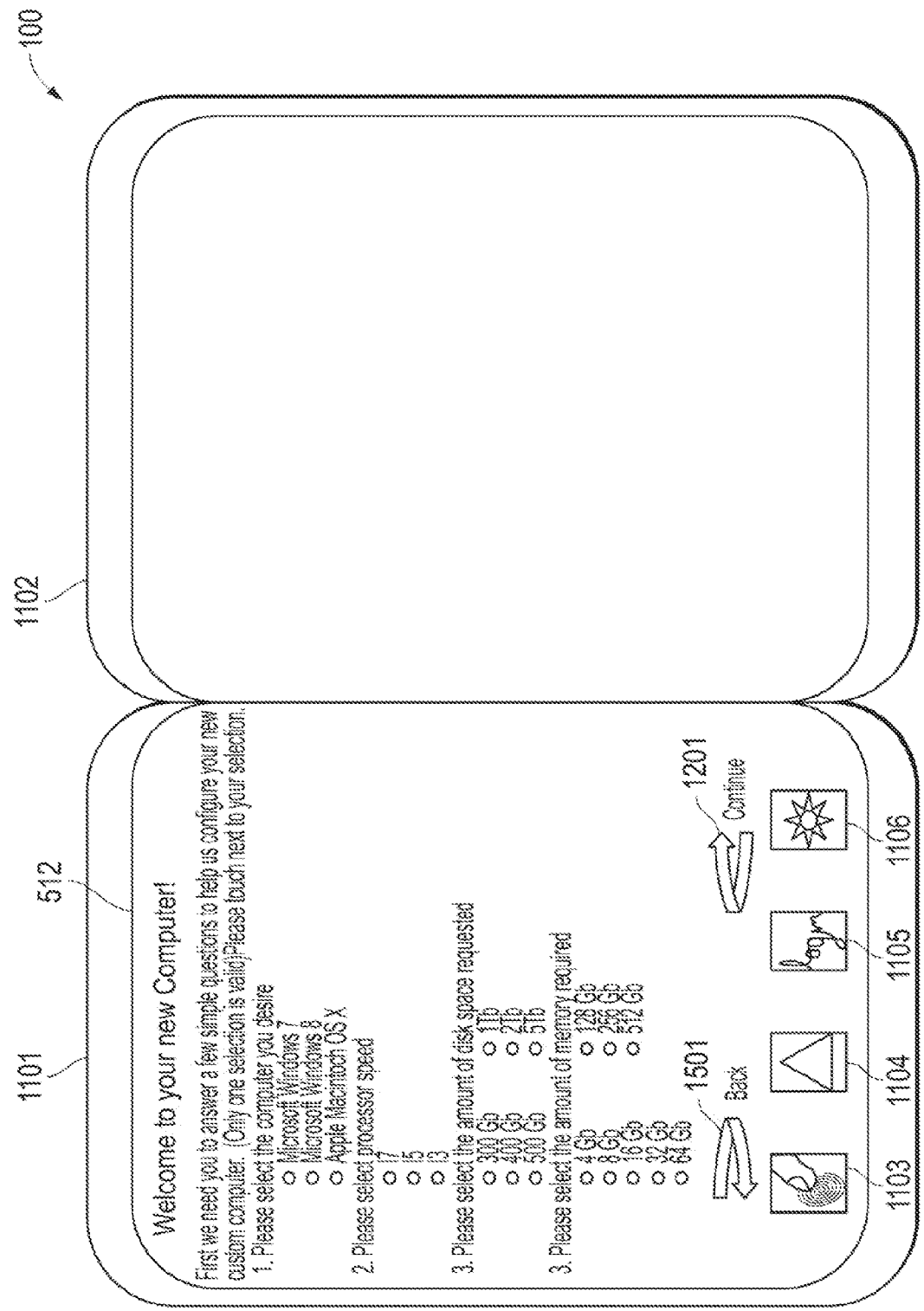
FIG. 15 illustrates a portable multifunction device in Single Screen operation showing configuration screen.

FIG. 15 illustrates when the selection was "Would you like to custom build your computer by answering a few questions?" With a display coming from the corporate data center 101, with questions that require a response from the user via the user's local device 100. The corporate computer resource 330 records the responses, and establishes the files to authenticate with to gain access each time. This process continues until enough information is gathered to request the private data center 102 to configure, construct, and build the requested system or systems for the user. After the configuration has been completed each successive login will be accomplished by the user merely submitting his fingerprint, using the fingerprint reader 1103. The user is presented with the following requests and options, as shown in FIG. 15:

1. Please select the computer you desire
   Microsoft Windows 7
   Microsoft Windows 8
   Apple Macintosh OS X
2. Please select processor speed
   I7
   I5
   I3
3. Please select the amount of disk space requested

| |
|---|
| 300 Gb |
| 400 Gb |
| 500 Gb |
| 1 Tb |
| 2 Tb |
| 5 Tb |

4. Please select the amount of memory required

| |
|---|
| 4 Gb |
| 8 Gb |
| 16 Gb |
| 32 Gb |
| 64 Gb |
| 128 Gb |
| 256 Gb |
| 512 Gb |

The continue button 1201 and the back button 1501 allow the user to accept selections or move backward and reselect.

Figure 16:
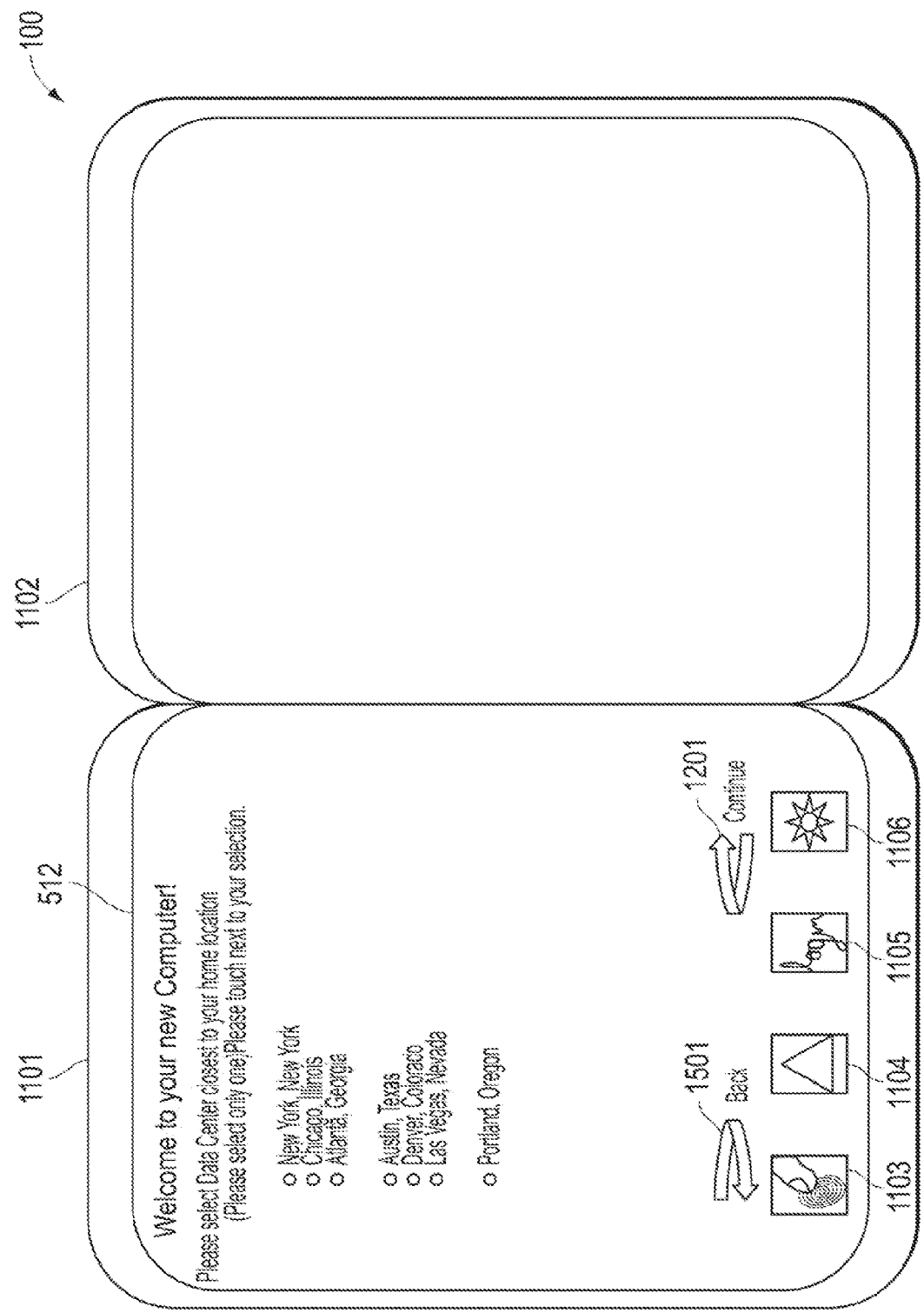
FIG. 16 illustrates a portable multifunction device in Single Screen operation showing configuration screen.

Referring now to FIG. 16, the user is asked to select a private data center 102 closest to his home location. The corporate data center 101 choices place every user inside the goal of 50 millisecond maximum latency expected, although actual speeds may vary for each user.

Figure 17:
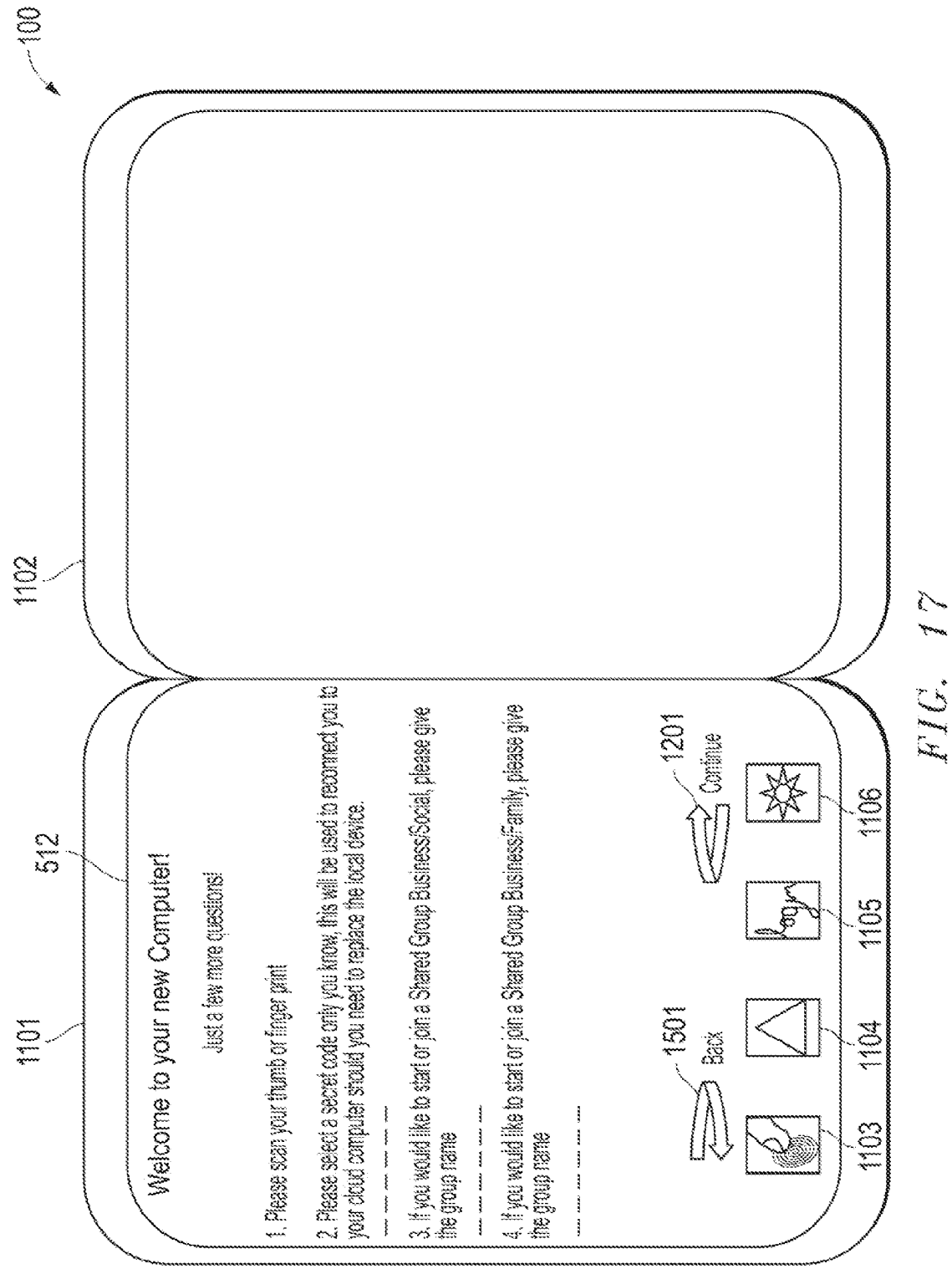
FIG. 17 illustrates a portable multifunction device in Single Screen operation showing configuration screen.

Referring now to FIG. 17, the user is asked to scan his fingerprint. His fingerprint is then used in place of a username/password. The user is then asked to select a secret code only he knows, and is told that such code will be used to reconnect him to his cloud computer should he need to replace his local device 100. The user is then asked if he would like to start or join a shared group business/social, and to give the group name. This is an optional file share similar to the commercially-available "Dropbox" service, where information in this folder can be shared with a group. The user is then asked if he would like to start or join a shared group business/family, and to give the group name. Again, this is an optional file share similar to the commercially-available "Dropbox" service, where information in this folder can be shared with a group.

Figure 18:
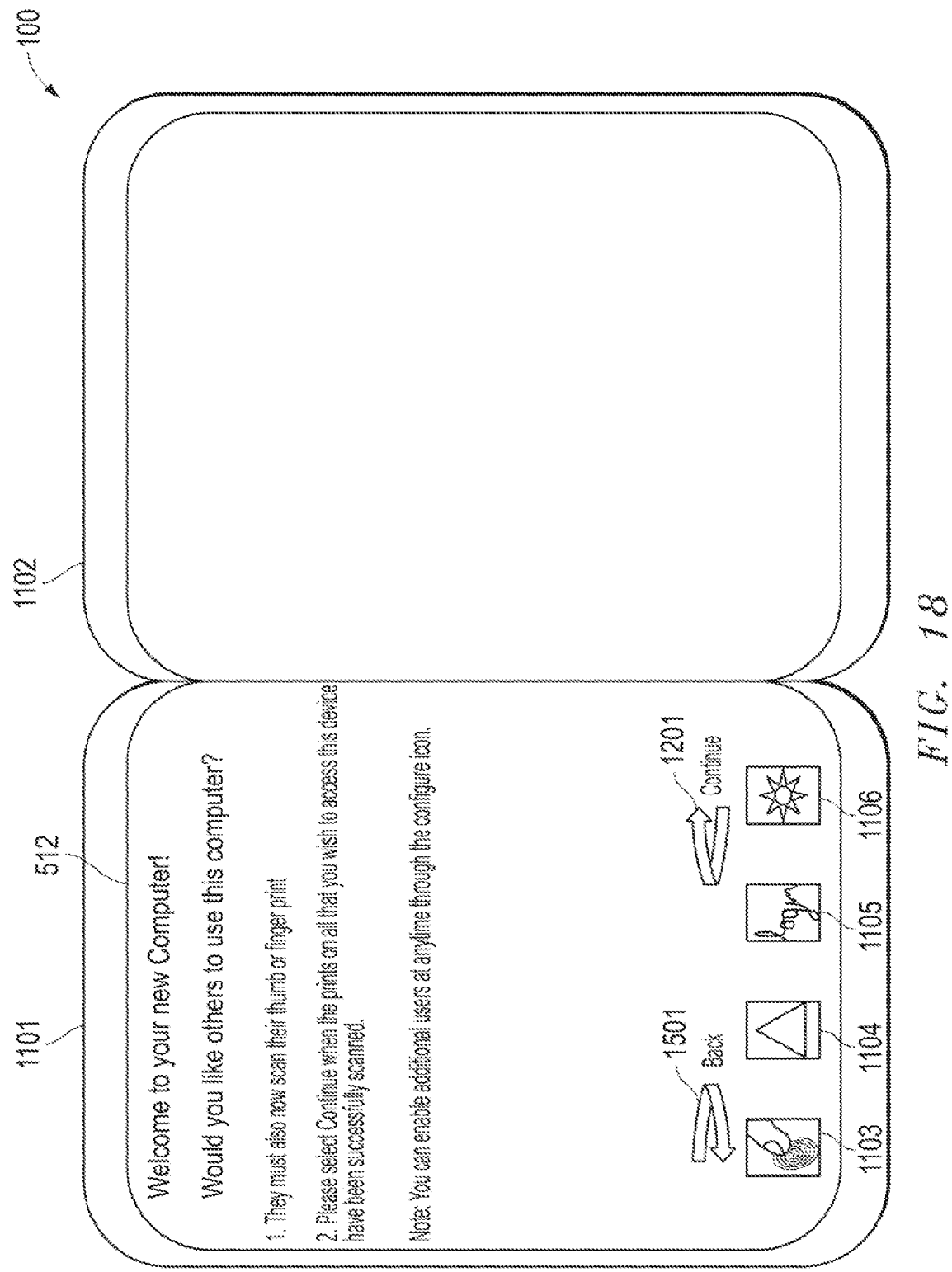
FIG. 18 illustrates a portable multifunction device in Single Screen operation showing configuration screen.

Referring now to FIG. 18, the user is allowed to set up additional users of the local device 100. To do so, they must also now scan their thumb or fingerprint. The user is then instructed to select the continue button 1201 when the prints of all that he wishes to access the local device 100 have been successfully scanned, and is instructed that he can enable additional users at any time through the configure button 1104.

Figure 19:
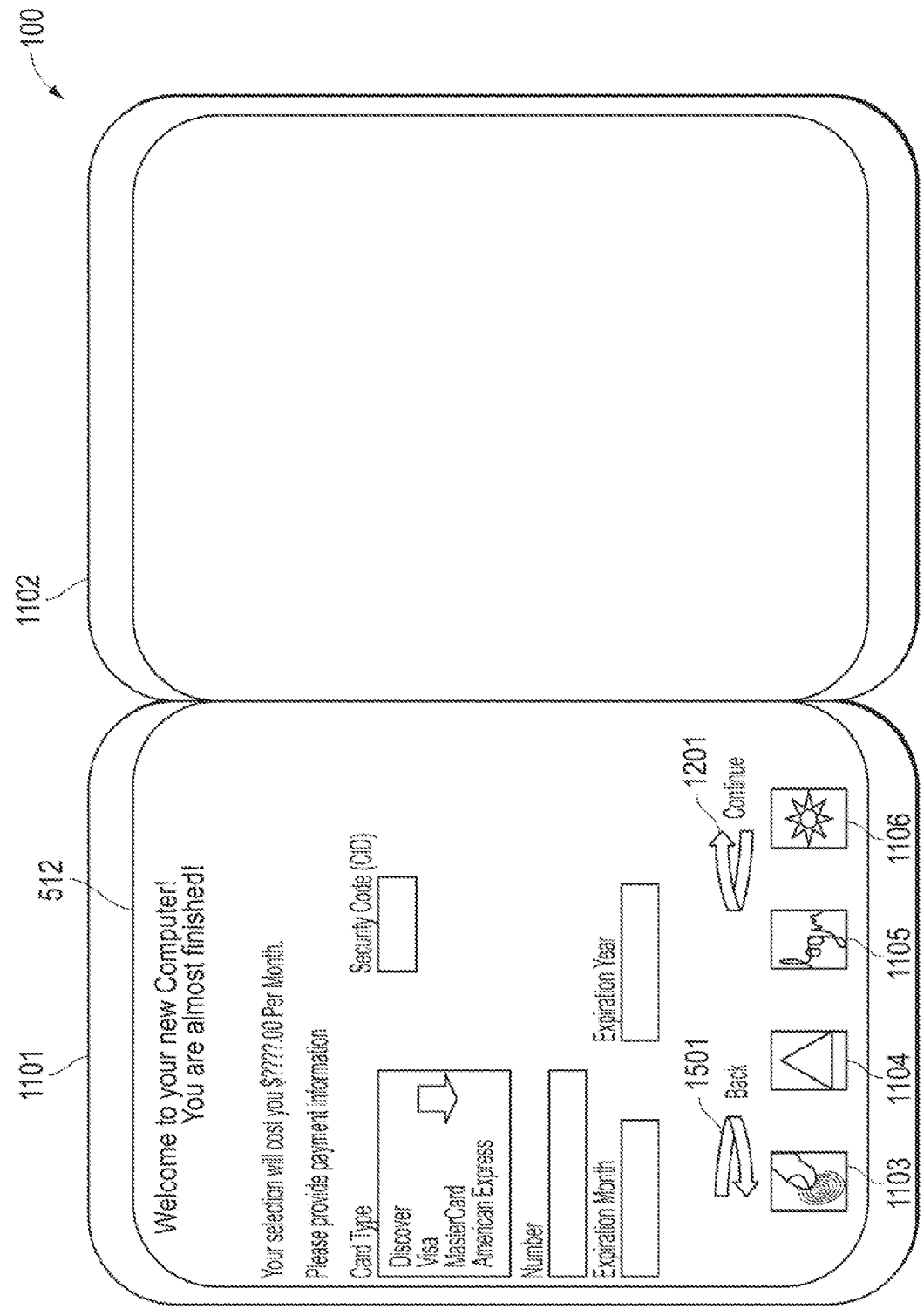
FIG. 19 illustrates a portable multifunction device in Single Screen operation showing configuration screen.

Referring now to FIG. 19, the user is instructed what his selection will cost him per month. The selections are valued against the chosen data center and provided for approval and acceptance by the user. The user is then asked to provide payment information, and questions are asked to gather information to implement billing.

Figure 20:
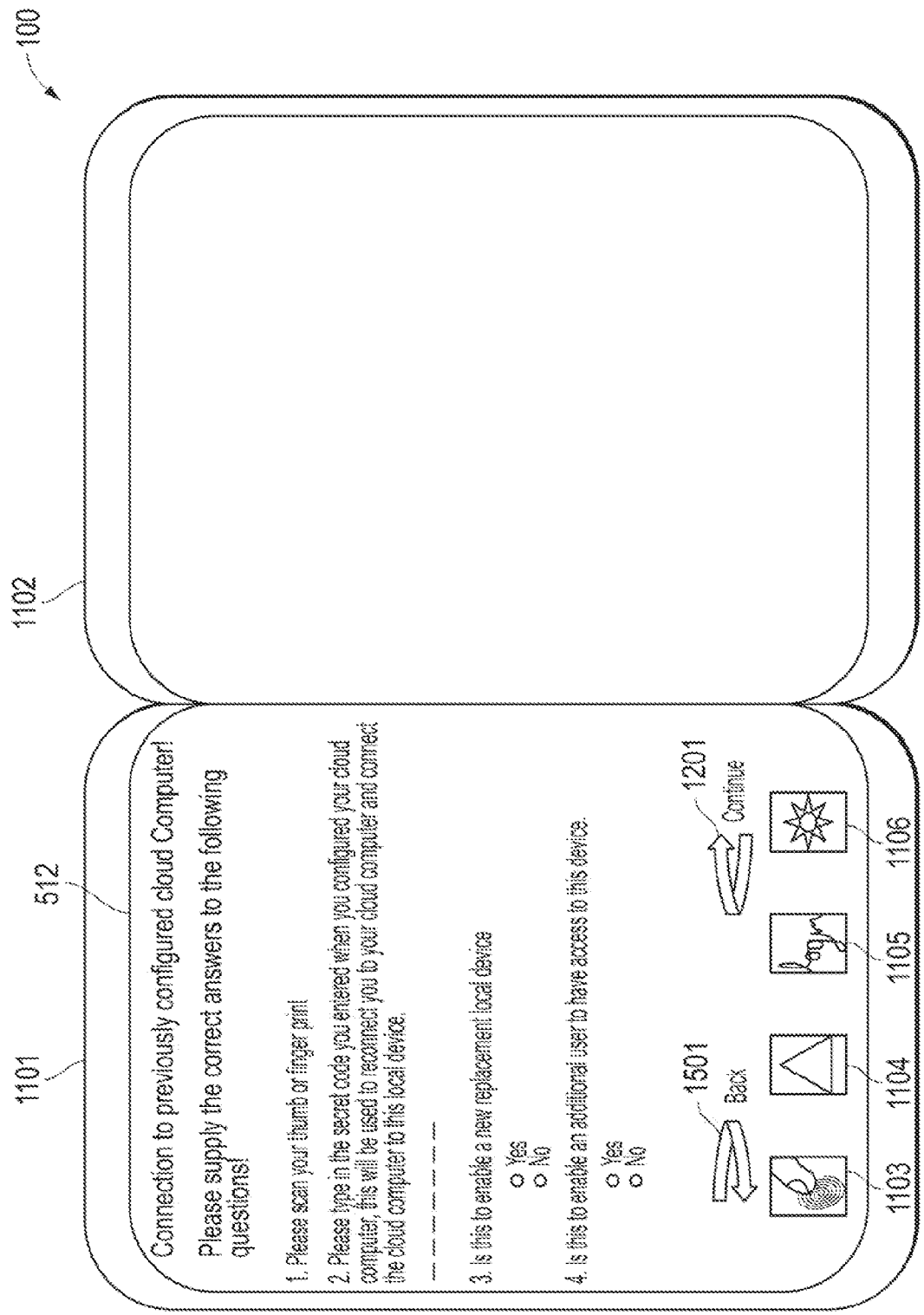
FIG. 20 illustrates a portable multifunction device in Single Screen operation showing configuration screen for the replaced local device or to enable additional users.

Referring now to FIG. 20, this screen is for adding additional/replacement resources. The local device 100 displays to the user the following questions:

"Please scan you thumb or finger print."
"Please type in the secret code you entered when you configured your cloud computer, this will be used to reconnect you to your cloud computer and connect the cloud computer to this local device."
"Is this to enable a new replacement local device?" (this question is for when the local device 100 has failed or has been lost).
"Is this to enable an additional user to have access to this device?" (to enable others to use this device)

Figure 21:
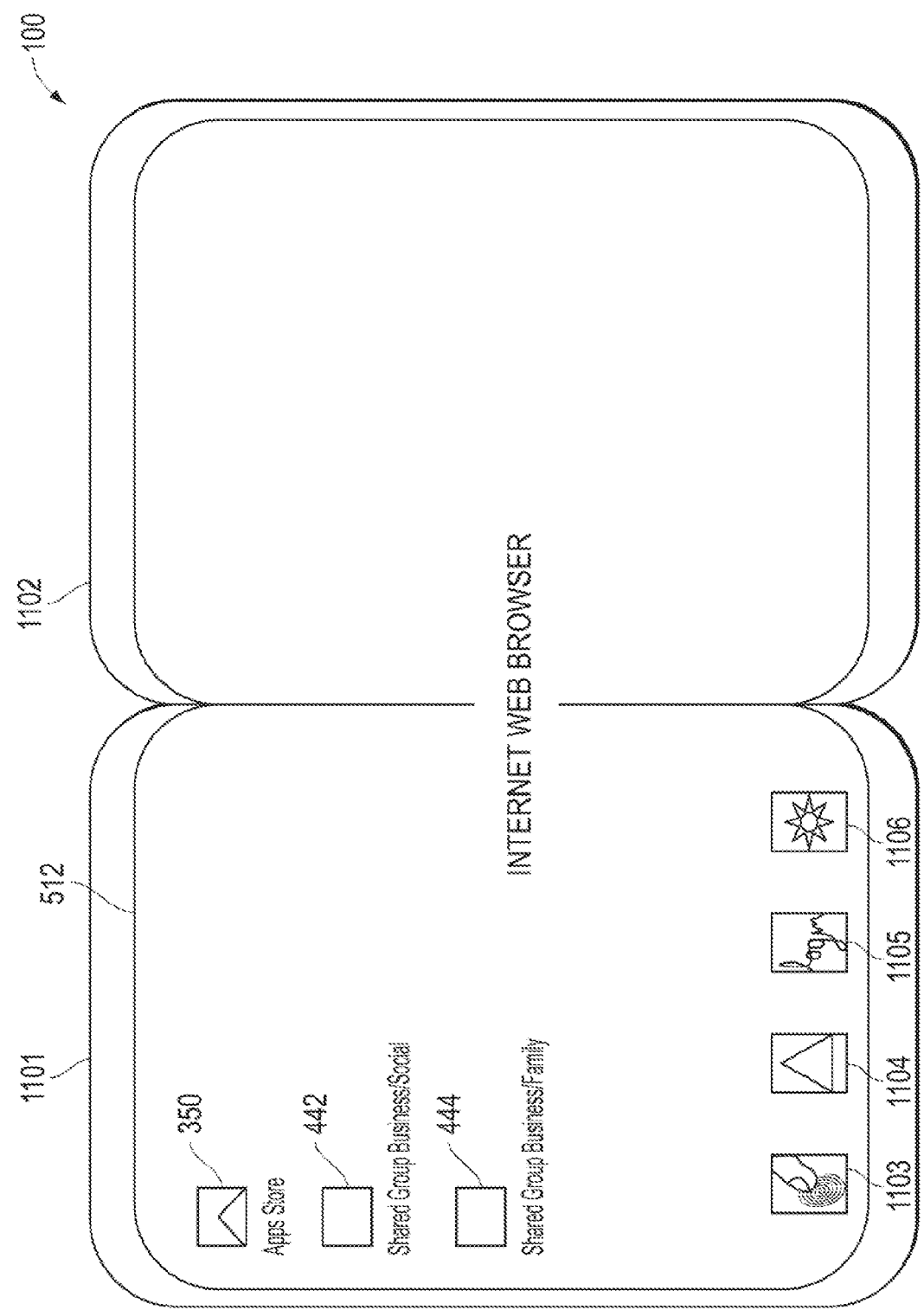
FIG. 21 illustrates a portable multifunction device in Dual Screen operation showing configuration complete and connection established to cloud computer.

Referring now to FIG. 21, the local device 100 is shown in the dual screen mode. The private data center 102, the client 2D/3D driver module 217, the server 2D 3D driver module 422, work together to provide information on the screen 512 and on the screen 514. The application store 350 is linked to the corporate data center 101. The shared group business/social resources 442 and the shared group business/family resources control 444 are linked to the private data center 102 and to the corporate data center 101 for authentication. Not shown is the complete computer system. If the configuration is Windows-based, then the start button is lower left with all the options and feel of a standard Windows operating system. The local device 100 supports all the applications and games that run under Windows. The same holds true for Apple systems.

Figure 22:
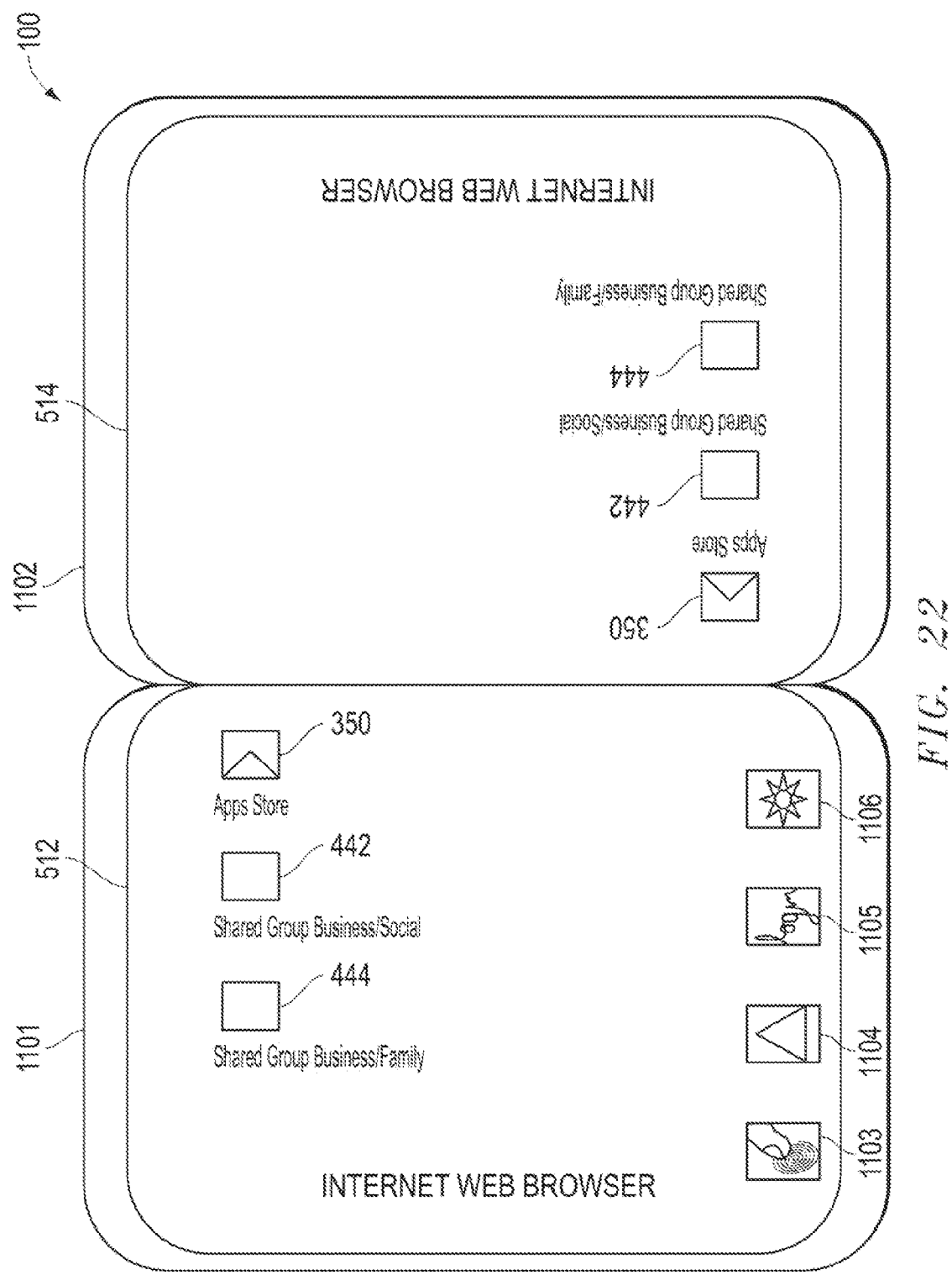
FIG. 22 illustrates a portable multifunction device in Dual Screen Conference Operation showing configuration complete and connection established to cloud computer.

Referring now to FIG. 22, the local device 100 is shown operating as a video conference device. In this configuration the screens are digitally turned so the local device 100 can be positioned with the locking fingers 814, 816 on the rear 815, 817 when open to 240 degrees This position will allow the users and all others on the opposite side to view the same images as the user since the screens display have identical information displayed. The screen configuration is set under the settings button 1106 on the local device 100, and not from the corporate data center 101, nor from the private data center 102.

Figure 23:
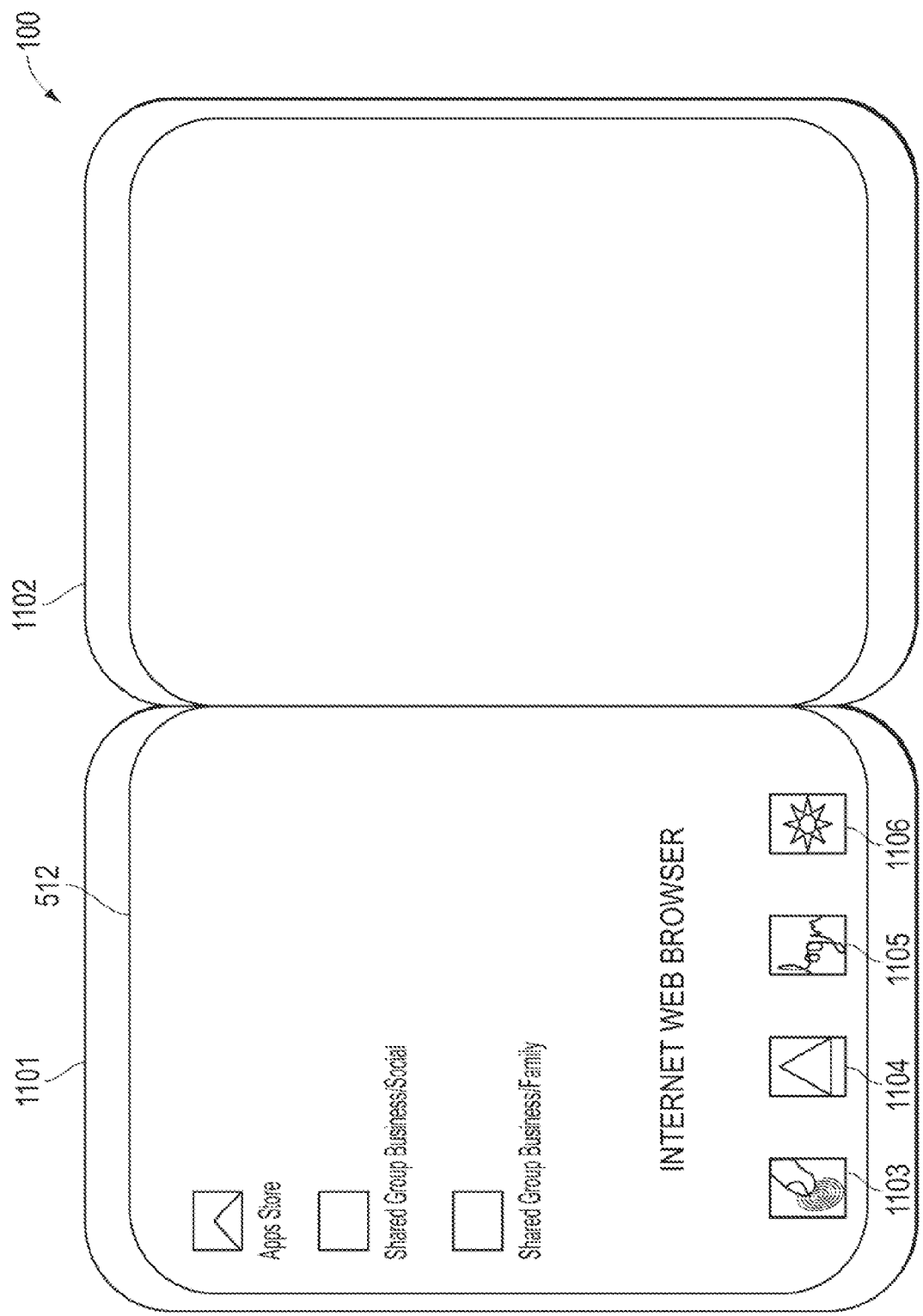
FIG. 23 illustrates a portable multifunction device in Single Screen operation showing configuration complete and connection established to cloud computer.

Referring now to FIG. 23, the local device 100 is shown with only a single screen. It can perform all the functions of the dual screen device, although all displays are constrained to fit on a single screen.

Figure 24:
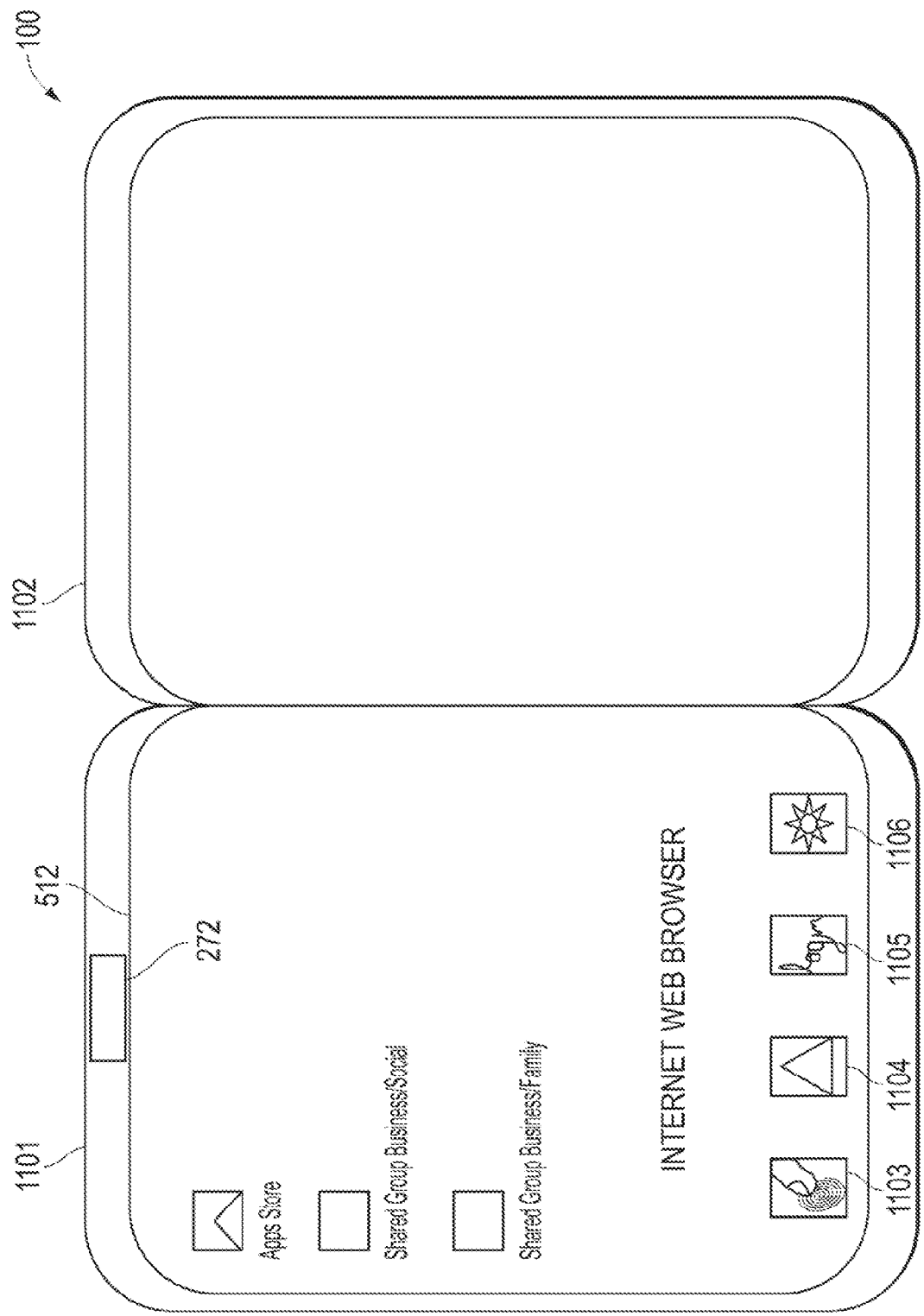
FIG. 24 illustrates a portable multifunction device in Single Screen operation showing Proximity Sensor to determine when the device is opened and operational.

Referring now to FIG. 24, the local device 100 is shown operating in single screen mode. The proximity sensor 272 turns off and locks the screen when the local device 100 is closed. The fingerprint reader 1103 is enabled to unlock when the correct fingerprint is supplied.

Figure 25:
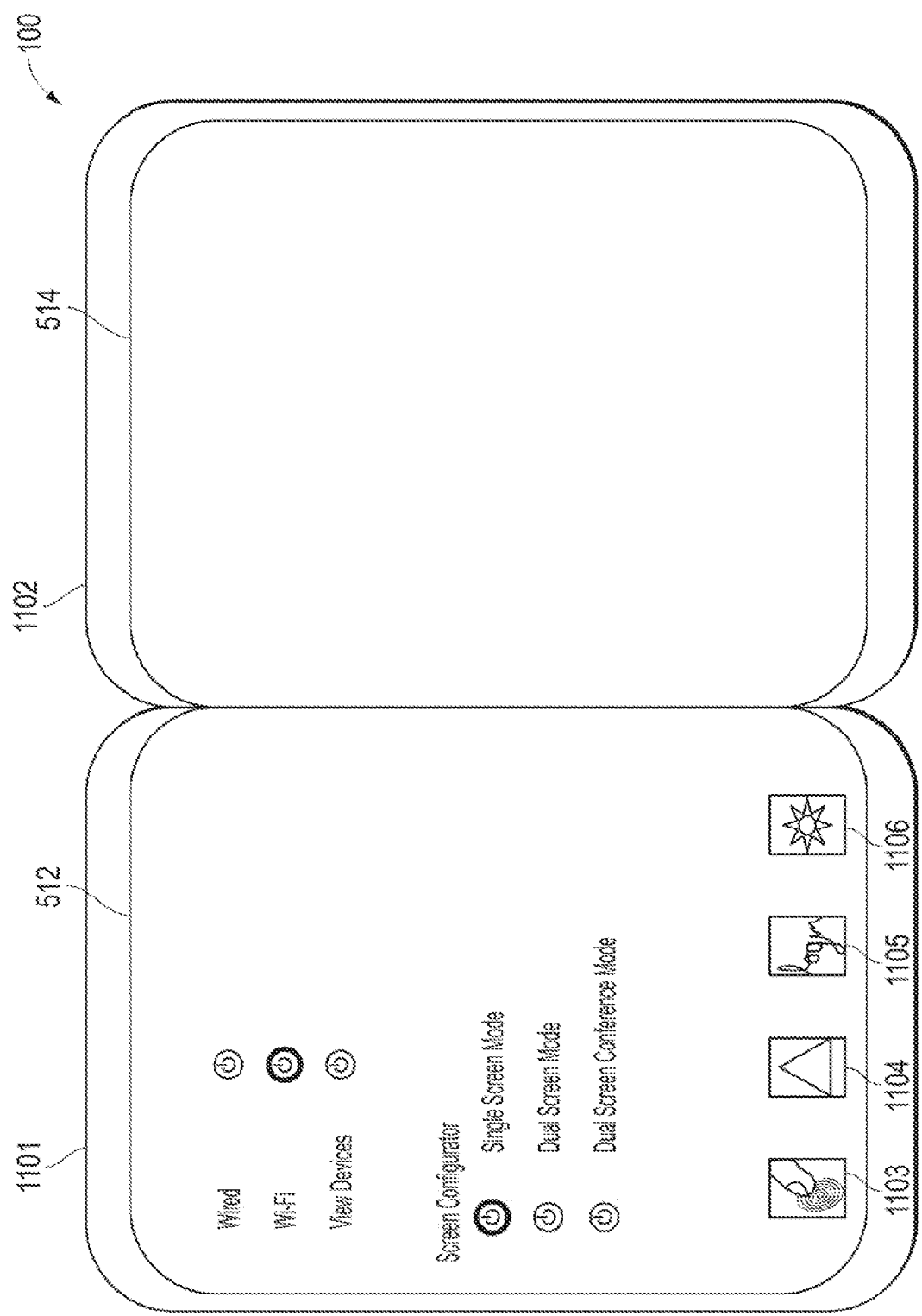
FIG. 25 illustrates a portable multifunction device in Single Screen operation showing the Settings to establish the operation of the device, currently set to Wi-Fi and Single Screen operation.

Referring now to FIG. 25, the local device 100 is shown with the selectable options displayed. This screen is reached by activating the settings button 1106. Options are enabled or disabled from this screen. Only minimal options are shown. The user can add more options as desired.

Figure 26:
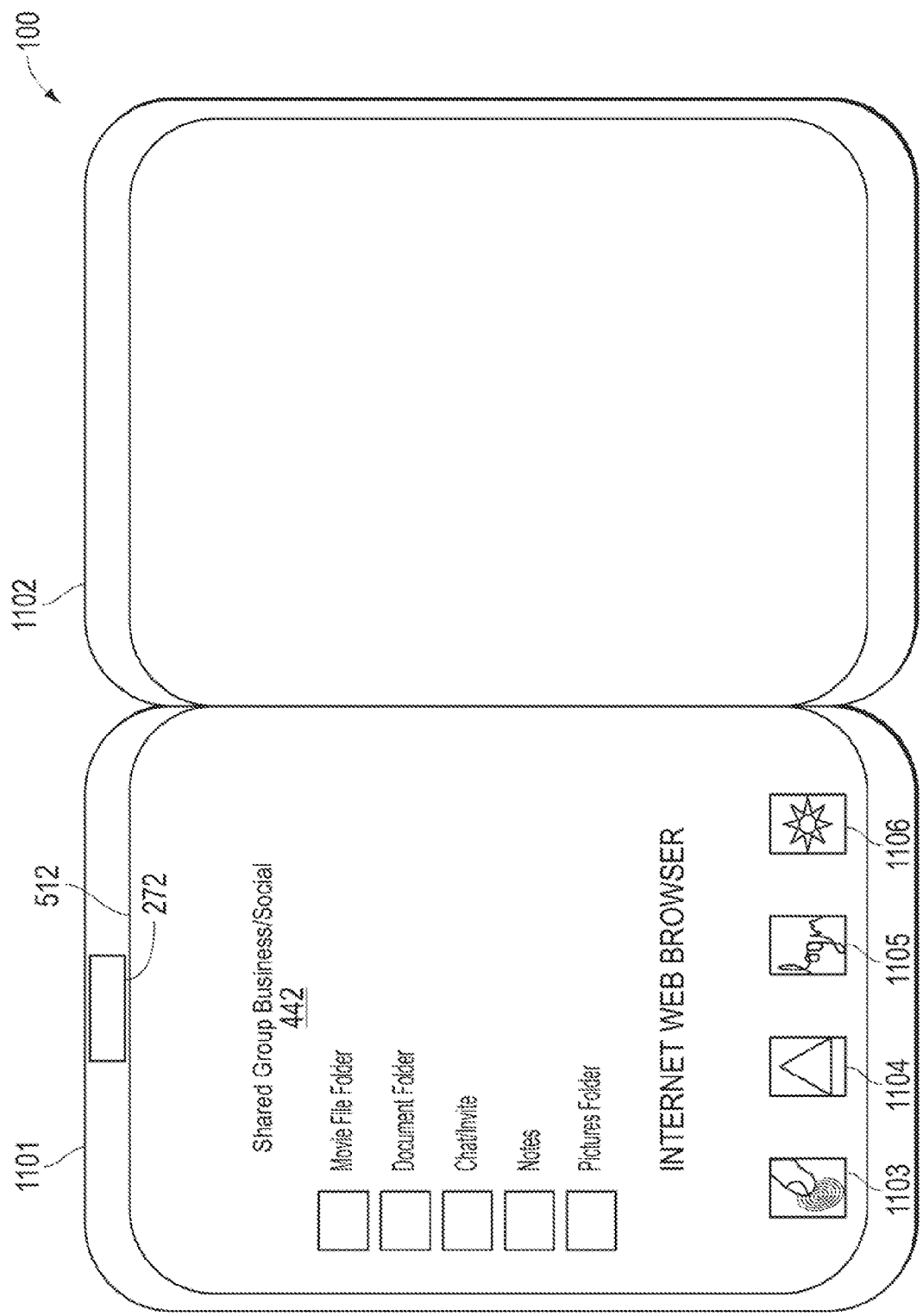
FIG. 26 illustrates a portable multifunction device in Single Screen operation showing the Settings to establish the Shared Group Business/Social.

Referring now to FIG. 26, the local device 100 is shown with the selected shared group business/social resources 442. Although not shown, the displayed icons are linked to the corporate data center 101 for authentication, to the private data center 102, and to the storage system 432. There are additional options inside the folders shown on the screen 512. The folders function similarly as the technology employed by the well-known company "Dropbox".

Figure 27:
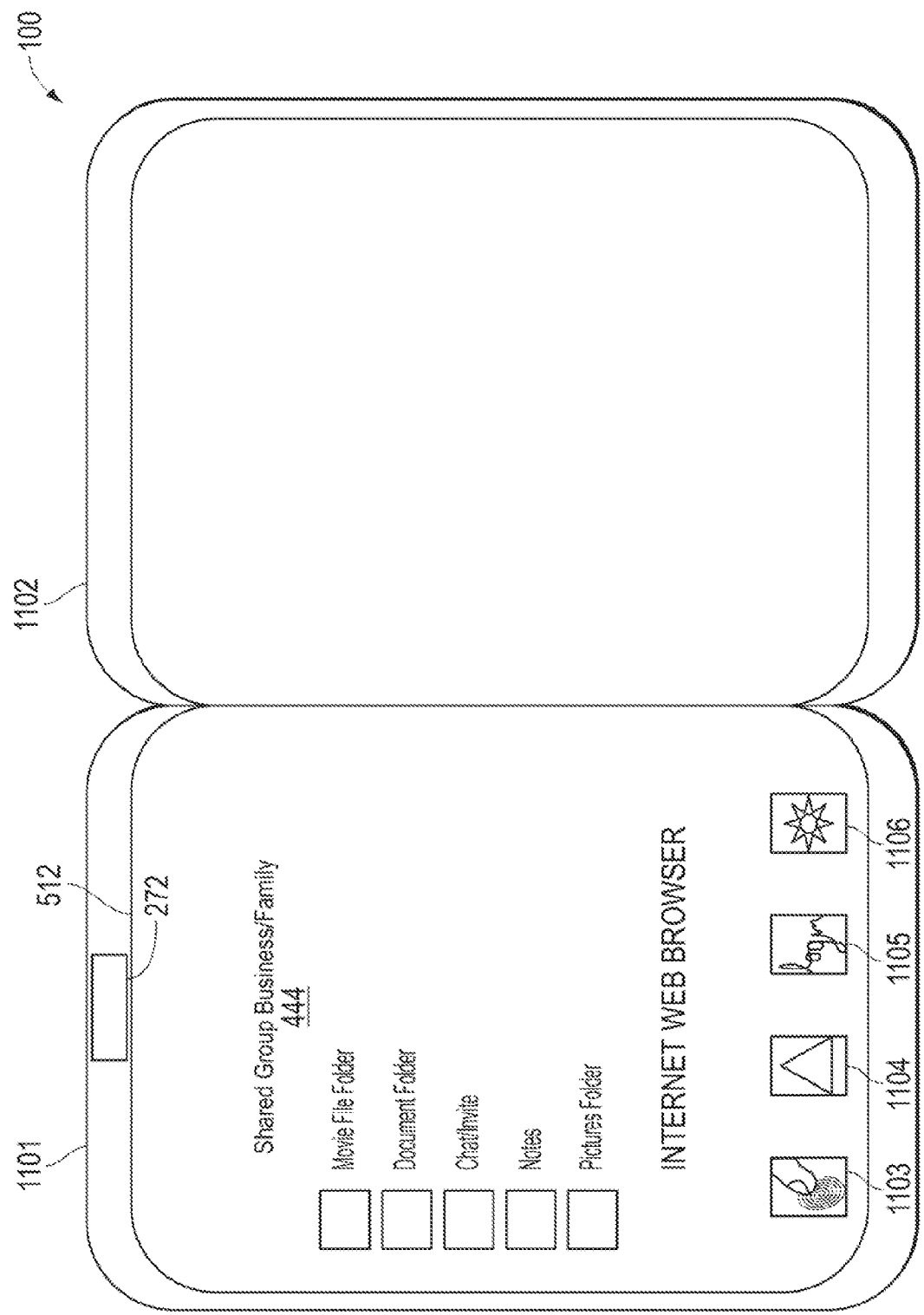
FIG. 27 illustrates a portable multifunction device in Single Screen operation showing the Settings to establish Shared Group Business/Family.

Referring now to FIG. 27, the local device 100 is shown with the selected shared group business/family resources control 444. Although not shown, the displayed icons are linked to the corporate data center 101 for authentication, to the private data center 102, and to the storage system 432. There are additional options inside the folders shown on the screen 512. The folders function similarly as the technology employed by the well-known company "Dropbox".

What is claimed is:

1. A method for providing a reduced latency connection, facilitating a remote computer resource mobility between a client device and a private data center, and for providing variable, changeable computing resources as desired by a user, the method comprising the steps of:
   a. in response to a user pressing an icon on the client device, connecting the client device to a corporate data center;
   b. the corporate data center authenticating the user;
   c. in response to the user requesting the use of any private data center, the client device relaying a current geographic location of the client device to the corporate data center;
   d. the corporate data center facilitating communication with private data centers, wherein the user uses the client device to interact with any remote computer resource located at any private data center, wherein the client device sends the user's input to a 2D/3D server located in a first-selected remote computer resource, and wherein the client device receives a screen content from the 2D/3D server which is generated by the first-selected remote computer resource in response to the users input, after receiving an address of a private data center from the corporate data center, wherein the corporate data center picks a selected private data center based on a location-identifier; and
   e. allowing the selected private data center to initialize a user-session with either (i) a remote computer resource that was last used by the user or (ii) a newly-configured remote computer resource, by communicating with the selected private data center, instead of communicating with the corporate data center;
   wherein such actions reducing a delay that would otherwise be experienced by the user while using the client device, and the user gains access to the selected private data center using authentication methods of either (i) a biometric interface, (ii) a graphical user interface, (iii) a machine tag, or (iv) a secret code when displaying from the private data center on the client device, using a graphical user interface,
   wherein the selected private data center is provisioned across a cloud provider, and wherein the selected private data center is associated with a cloud computing environment also accessing a user-selected and a configured computing resource,
   wherein the user-selected and the configured computing resource is input via the graphical user interface by the user during initial configuration, and any re-configuration also communicating a request to a cloud provider to launch a remote computer resource in response to a user selection of an icon on the client device, also providing access for at least one user to the remote computer resource using a graphical user interface;
   wherein the remote computer resource is configured per a user's requirements with a availability of applications for computational and recreational activities;
   wherein the client device, along with the remote computer resource, includes software that moves the 2D/3D graphics, data, and a voice bi-directionally to accommodate the user's requirements;
   wherein the remote computer resource provides an option for a game access; and
   wherein the remote computer resource provides software that maps the client device to the remote computer resource.

2. The method of claim 1, wherein the remote computer resource is provided with an operating system selected by the user from the group consisting of Microsoft OS, Apple OS, Google OS, and Linux/Unix OS.

3. The method of claim 2, wherein the remote computer resource comprises: a processing resource; a storage resource; a network resource; an application store; a games store; a chat application; and software to support graphical data movement.

4. The method of claim 3, wherein the remote computer resource (a) performs backup and recovery, (b) saves, logs, and restarts instances, (c) creates, deletes, copies, and reverts to virtual images, and (d) interacts with gaming programs and with stores.

5. The method of claim 4, wherein the remote computer resource sends pertinent questions to the user of the client device to determine the computing power needed by the user, and then the remote computer resource upgrades itself as necessary to provide the user with the computing power that the user needs.

6. The method of claim 1, wherein the client device has a first and a second viewing screen, and wherein the second viewing screen is configured to either be a slave screen to the first screen, or to operate independently, at the user's discretion, and wherein the client device is configured to also allow pairing of multiple screens to the first screen.

7. The method of claim 6, wherein a television/cable resource using a location-identifier allows the user to view a television channel near the location of the client device.

8. The method of claim 1, wherein the step of the client device relaying a current geographic location of the client device to the corporate data center uses a WI-FI or a cellular network.

9. The method of claim 1, wherein when the client device relays a current geographic location of the client device to the corporate data center, it does so by sending a location-identifier.

* * * * *